(12) United States Patent
Grant et al.

(10) Patent No.: US 7,687,926 B2
(45) Date of Patent: *Mar. 30, 2010

(54) STARTER SYSTEM FOR PORTABLE INTERNAL COMBUSTION ENGINE ELECTRIC GENERATORS USING A PORTABLE UNIVERSAL BATTERY PACK

(75) Inventors: Jeffrey P. Grant, Forest Hill, MD (US); Michael K. Forster, White Hall, MD (US)

(73) Assignee: Black & Decker Inc., Newark, DE (US)

( * ) Notice: Subject to any disclaimer, the term of this patent is extended or adjusted under 35 U.S.C. 154(b) by 555 days.

This patent is subject to a terminal disclaimer.

(21) Appl. No.: 11/526,825

(22) Filed: Sep. 25, 2006

(65) Prior Publication Data

US 2007/0120366 A1 May 31, 2007

Related U.S. Application Data

(63) Continuation-in-part of application No. 11/321,773, filed on Dec. 29, 2005, now Pat. No. 7,309,928, said application No. 11/321,773 is a continuation-in-part of application No. 10/453,988, filed on Jun. 4, 2003, now Pat. No. 7,180,200.

(60) Provisional application No. 60/727,201, filed on Oct. 14, 2005, provisional application No. 60/386,904, filed on Jun. 6, 2002.

(51) Int. Cl.
*F02B 63/04* (2006.01)

(52) U.S. Cl. ..................................... 290/1 A

(58) Field of Classification Search ................. 290/34, 290/1 A; 322/10, 16, 29; 439/504, 500; 320/112, 114

See application file for complete search history.

(56) References Cited

U.S. PATENT DOCUMENTS 2,526,671 A 10/1950 Kober (Continued)

FOREIGN PATENT DOCUMENTS

DE 29821825 U1 12/1998

(Continued)

OTHER PUBLICATIONS

Communication Relating to the Results of the Partial International Search Report.

*Primary Examiner*—Julio Gonzalez
(74) *Attorney, Agent, or Firm*—Harness, Dickey & Pierce, P.L.C.

(57) ABSTRACT

A portable power driven system has a manually movable frame. In one example, an internal combustion engine and a generator device that generates AC power are supported on the frame. The internal combustion engine drives the generator device. An electrically powered starting device is coupled to the internal combustion engine. A control panel is coupled to the frame and includes at least one AC outlet and a battery receptacle that is electrically coupled to the starting device. The battery receptacle is materially the same as a foot of a cordless power tool that receives a battery pack. According to one aspect, the battery pack for the cordless power tool may be permanently mounted in the battery receptacle and provides electrical power to the starting device. The battery receptacle may be contained in an enclosure. The enclosure may provide biasing members urging the battery pack into the battery receptacle.

57 Claims, 18 Drawing Sheets

U.S. PATENT DOCUMENTS

| | | | |
|---|---|---|---|
| 3,366,869 A | 1/1968 | Young |
| 3,908,161 A | 9/1975 | Messenger |
| 4,122,354 A | 10/1978 | Howland |
| 4,743,777 A | 5/1988 | Shilling et al. |
| 4,772,802 A | 9/1988 | Glennon et al. |
| 4,786,852 A | 11/1988 | Cook |
| 4,830,412 A | 5/1989 | Raad et al. |
| 4,883,973 A | 11/1989 | Lakey et al. |
| 4,947,100 A | 8/1990 | Dhyanchand et al. |
| 4,965,477 A | 10/1990 | Stadler et al. |
| 4,988,584 A | 1/1991 | Shaper |
| 5,012,177 A | 4/1991 | Dhyanchand |
| 5,013,929 A | 5/1991 | Dhyanchand |
| 5,038,095 A | 8/1991 | Kirchberg et al. |
| 5,065,086 A | 11/1991 | Takakado |
| 5,091,679 A | 2/1992 | Murty et al. |
| 5,111,127 A | 5/1992 | Johnson |
| 5,132,604 A | 7/1992 | Shimane et al. |
| 5,175,439 A | 12/1992 | Harer et al. |
| 5,208,525 A | 5/1993 | Lopic et al. |
| 5,212,952 A | 5/1993 | Yokoyama et al. |
| 5,325,042 A | 6/1994 | Murugan |
| 5,629,602 A | 5/1997 | Makino et al. |
| 5,689,174 A | 11/1997 | Pacheco, Sr. |
| 5,751,070 A | 5/1998 | Nagao et al. |
| 5,787,693 A | 8/1998 | Dyke et al. |
| 5,920,161 A | 7/1999 | Obara et al. |
| 5,929,537 A | 7/1999 | Glennon |
| 5,998,976 A | 12/1999 | Steffan |
| 6,007,373 A | 12/1999 | Chew |
| 6,008,545 A | 12/1999 | Nagano et al. |
| 6,075,341 A | 6/2000 | White et al. |
| 6,084,313 A | 7/2000 | Frank |
| 6,100,599 A * | 8/2000 | Kouchi et al. ............... 290/1 A |
| 6,118,186 A | 9/2000 | Scott et al. |
| 6,137,251 A | 10/2000 | Huang et al. |
| 6,140,797 A | 10/2000 | Dunn |
| 6,160,373 A | 12/2000 | Dunn et al. |
| 6,191,552 B1 | 2/2001 | Kates et al. |
| 6,200,277 B1 | 3/2001 | Kensey |
| 6,202,776 B1 | 3/2001 | Masberg et al. |
| 6,260,578 B1 | 7/2001 | Kuehnemund et al. |
| 6,265,091 B1 | 7/2001 | Pierson et al. |
| 6,265,786 B1 | 7/2001 | Bosley et al. |
| 6,308,059 B1 | 10/2001 | Domes |
| 6,313,543 B1 | 11/2001 | Frank |
| 6,326,101 B1 | 12/2001 | White et al. |
| 6,380,719 B2 | 4/2002 | Underwood et al. |
| 6,639,370 B1 | 10/2003 | Gabrys |
| 6,644,264 B2 | 11/2003 | Shoemaker |
| 7,104,847 B2 | 9/2006 | Sodemann et al. |
| 7,183,745 B2 | 2/2007 | Kubale et al. |
| 7,309,928 B2 * | 12/2007 | Grant et al. ............... 290/1 A |
| 2001/0043052 A1 | 11/2001 | Griffey et al. |
| 2002/0125857 A1 | 9/2002 | Mastaler et al. |
| 2003/0117107 A1 * | 6/2003 | Zick et al. ............... 320/112 |
| 2004/0007402 A1 * | 1/2004 | Kujawa ............... 180/53.8 |
| 2004/0080300 A1 | 4/2004 | Xu et al. |
| 2005/0031944 A1 | 2/2005 | Sodemann et al. |
| 2005/0225288 A1 | 10/2005 | Cole et al. |
| 2005/0280393 A1 | 12/2005 | Feldmann |
| 2007/0120366 A1 | 5/2007 | Grant et al. |

FOREIGN PATENT DOCUMENTS

| | | |
|---|---|---|
| EP | 488108 A1 | 11/1991 |
| EP | 0338512 B1 | 9/1994 |
| EP | 1138938 A2 | 3/2001 |
| WO | WO-9821805 | 5/1998 |

\* cited by examiner

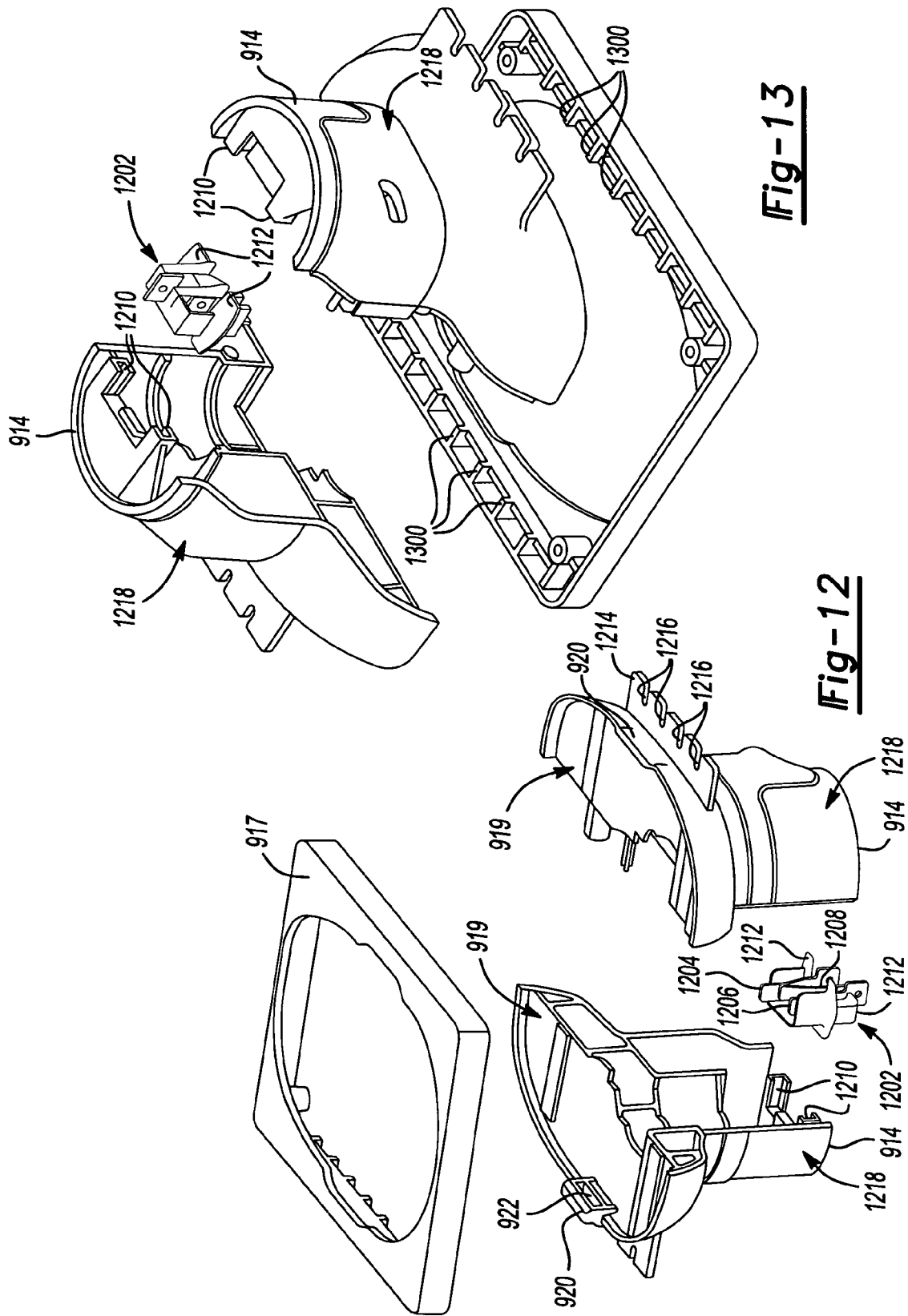

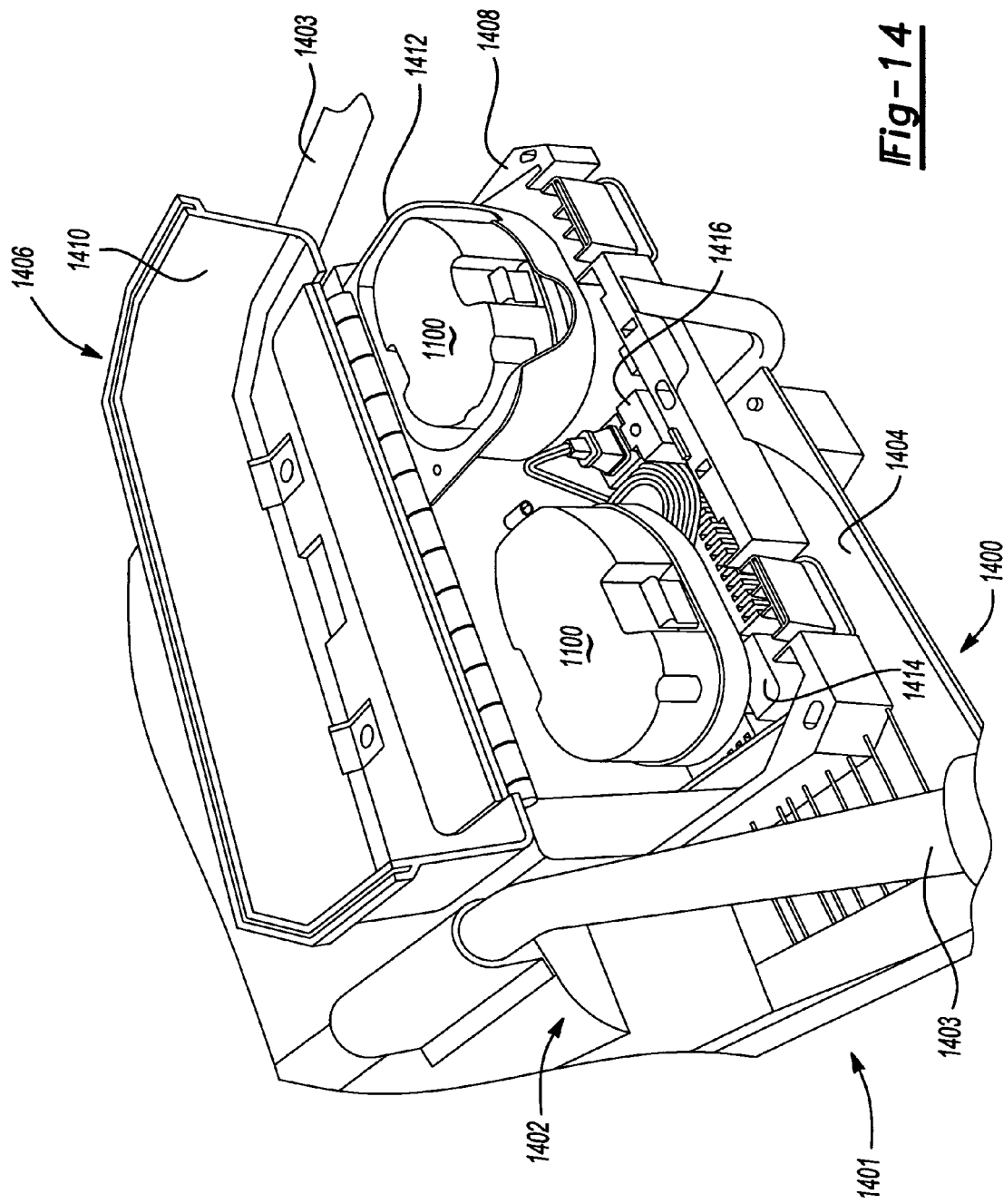

STARTER SYSTEM FOR PORTABLE INTERNAL COMBUSTION ENGINE ELECTRIC GENERATORS USING A PORTABLE UNIVERSAL BATTERY PACK

CROSS-REFERENCE TO RELATED APPLICATIONS

The present application is a continuation-in-part of U.S. patent application Ser. No. U.S. patent application Ser. No. 11/321,773 filed Dec. 29, 2005, which is a continuation-in-part of U.S. patent application Ser. No. 10/453,988 filed Jun. 4, 2003, which claims the benefit of U.S. Provisional Application No. 60/386,904 filed Jun. 6, 2002. The present application also claims the benefit of U.S. Provisional Application No. 60/727,201 filed Oct. 14, 2005 as does U.S. patent application Ser. No. 11/321,773. The disclosures of the above applications are incorporated herein by reference.

FIELD OF THE INVENTION

This invention relates generally to electrical power generators. More particularly, the invention relates to a system for utilizing a removable, portable universal battery pack and a permanent magnet generator (PMG) to start an internal combustion (IC) engine of the generator.

BACKGROUND OF THE INVENTION

Present day portable generators typically make use of a starter motor and a fixed lead acid battery to start an internal combustion (IC) engine that drives an alternator, thereby producing an electrical power output. The starter motor and fixed battery add size, bulk and weight to the portable generator. As can be appreciated, since the generator is intended to be transportable, keeping the generator as light and as small as possible is highly desirable.

In the latest portable generator technology, the alternator is replaced with a smaller and lighter permanent magnet generator (PMG) and an electronic power converter. In normal operation, the IC engine directly drives the PMG which then produces electrical power. This variable frequency (engine speed dependent), variable voltage power is then converted electronically to a constant voltage, constant frequency output, for example a 120 VAC, 60 Hz output. Typically, a PMG includes a single set of windings that are used to produce the electrical power output of the portable generator.

It would be highly desirable to provide a portable generator that utilizes a removable/portable universal battery pack adapted for use with various other DC powered tools to start the generator, thereby eliminating the need for the fixed lead-acid battery and making the generator lighter in weight and more manageable to maneuver.

It would further be highly desirable to provide a portable generator that utilizes such a portable universal battery pack in combination with a PMG adapted to start the IC engine. This would eliminate the need for the starter motor as well as the lead acid battery, thereby making the generator even lighter in weight and even more manageable to maneuver.

SUMMARY OF THE INVENTION

In accordance with an aspect of the invention, a portable power driven system has a manually movable frame. An internal combustion engine and a generator device that generates AC power may be supported on the frame. The internal combustion engine drives the generator device. An electrically powered starting device is coupled to the internal combustion engine. A control panel is coupled to the frame and includes at least one AC outlet and a battery receptacle that is electrically coupled to the starting device. The battery receptacle is materially the same as a foot of a cordless power tool that receives a battery pack. The battery pack for the cordless power tool may be permanently mounted in the battery receptacle and provides electrical power to the starting device.

In another aspect, a portable electrical generator has a manually movable frame. An internal combustion engine and a generator device that generates AC power are supported on the frame. The internal combustion engine drives the generator device. An electrically powered starting device is coupled to the internal combustion engine. A control panel has at least one AC outlet coupled to the generator device. An enclosure, supported by the frame, has a battery receptacle electrically coupled to the starting device. The battery receptacle is configured to receive a battery pack from a cordless power tool. A charging circuit may be electrically coupled between the battery receptacle and the generator device and selectively adapted to charge the battery pack during operation of the power generating device.

According to additional features, the enclosure may include a hinged lid portion movable between an open position and a closed position. The lid portion may have at least one biasing member adapted to urge the battery pack into the battery receptacle in a closed position.

According to another aspect, the battery receptacle of the generator system may define a first configuration. An adapter may define an insertion portion. The insertion portion may be selectively received into the battery receptacle. The adapter may include a receiving portion having a second configuration adapted to receive a second battery pack from a second cordless power tool. The second configuration may be distinct from the first configuration.

In an aspect, the battery receptacle receives a battery pack that is one of a plurality of battery packs having different voltages and the generator includes a voltage regulation circuit that couples the battery receptacle to the starting device. The voltage regulation circuit provides at an output coupled to the starting device a voltage at a desired level for the starting device regardless of the voltage of the battery pack received in the battery receptacle.

In other aspects, the portable power driven system may include an air compressor and a power washer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12 is an exploded perspective view of a battery receptacle of the control panel of FIG. 9;

FIG. 13 is an exploded perspective view of the battery receptacle of the control panel of FIG. 9;

FIG. 14 is a side perspective view of a portable generator in accordance with an aspect of the invention;

DETAILED DESCRIPTION OF THE PREFERRED EMBODIMENTS

The following description of the preferred embodiment(s) is merely exemplary in nature and is in no way intended to limit the invention, its application or uses.

Figure 1:
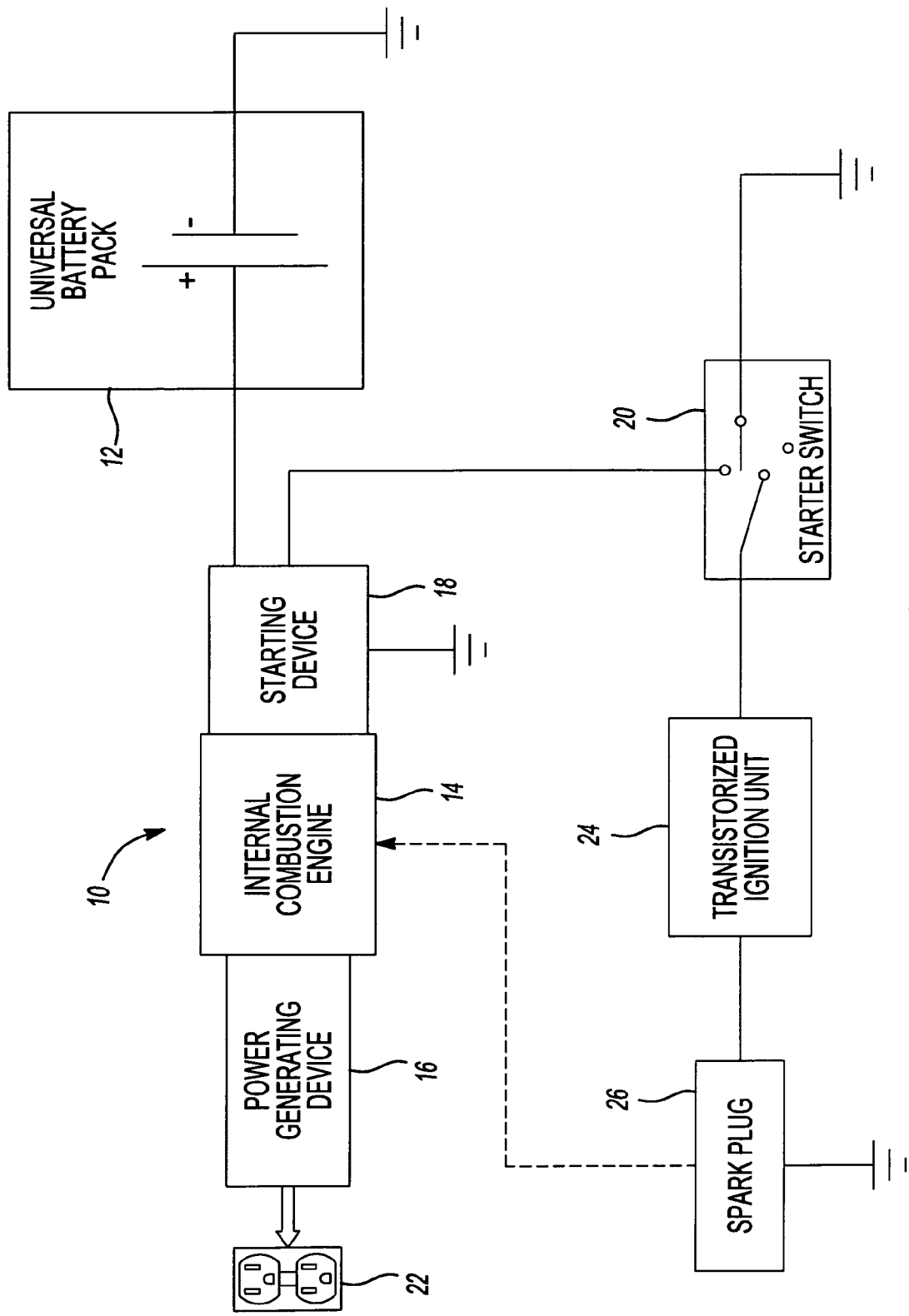
FIG. 1 is a simplified block diagram of a portable generator system, in accordance with an embodiment of the present invention, wherein the system utilizes a portable universal battery pack to start an internal combustion (IC) engine of the generator system.

FIG. 1 is a simplified block diagram of a portable generator system 10, in accordance with an embodiment of the present invention. The generator system 10 utilizes a portable universal battery pack 12 to start an internal combustion (IC) engine 14 that turns a power generating device 16. System 10 additionally includes a starting device 18 connected to universal battery pack 12 and a starter switch 20. Starter switch 20 is connected to a transistorized ignition unit 24, which is in turn connected to a spark plug 26. Starting device 18 is used to turn IC engine 14 at a rate sufficient to start IC engine 14. Once IC engine 14 is started, IC engine 14 drives power generating device 16, whereby power generating device 16 outputs AC power usable by a load connected to an electrical outlet 22.

Figure 2:
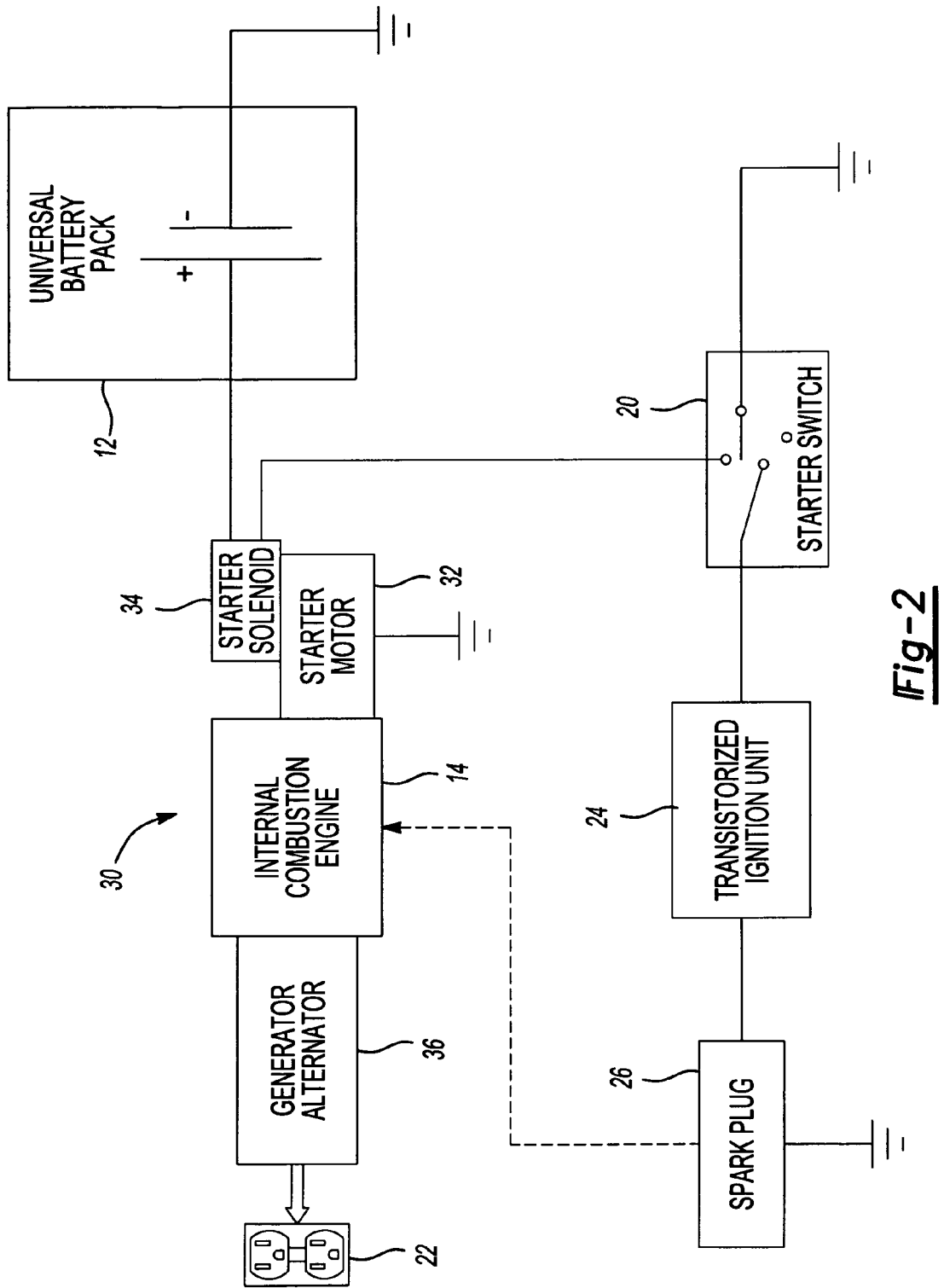
FIG. 2 is a simplified block diagram of an alternate embodiment of the portable generator system shown in FIG. 1.

FIG. 2 is a simplified block diagram of a portable generator system 30, which is an alternate embodiment of portable generator system 10 (shown in FIG. 1). In this embodiment, starting device 18 comprises a starter motor 32 and a starter solenoid 34. Additionally, power generating device 16 is an alternator 36. System 30 utilizes portable universal battery pack 12 to start IC engine 14 that turns alternator 36. Starter solenoid 34 is connected to battery pack 12 and used to initially turn starter motor 32. Starter solenoid 34 is also connected to starter switch 20. Starter switch 20 has a 'Start' position, an 'On' position and an 'Off' position. When starter switch 20 is placed in the 'Start' position, universal battery pack 12 provides low current power to starter solenoid 34.

Providing low current to starter solenoid 34 turns on starter motor 32, thereby turning IC engine 14. Starter switch 20 is spring-loaded so that it returns to the 'ON' position upon successfully starting IC engine 14. In the 'ON' position starter switch 20 directs power from ignition unit 24 to spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

Figure 3:
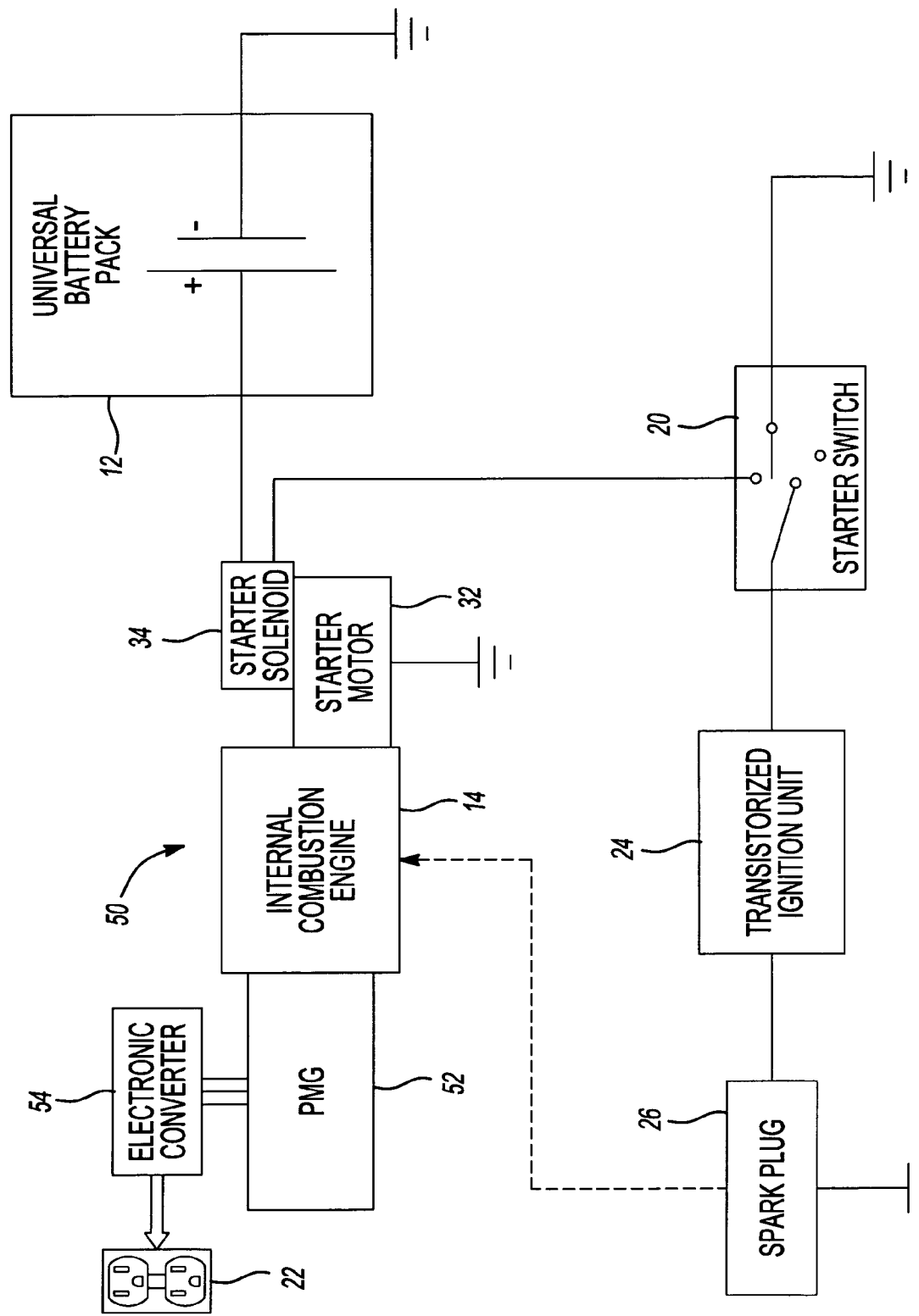
FIG. 3 is a simplified block diagram of another alternate embodiment of the portable generator system shown in FIG. 1 that utilizes a permanent magnet generator and electric converter to generate power.

FIG. 3 is a simplified block diagram of a portable generator system 50, which is an alternate embodiment of portable generator system 30 (shown in FIG. 1). In this embodiment, starting device 18 again comprises starter motor 32 and starter solenoid 34, while power generating device 16 comprises a permanent magnet generator (PMG) 52 and an electronic converter circuit 54. Generator system 50 utilizes portable universal battery pack 12 to start IC engine 14 that turns PMG 52, which is connected to electronic converter circuit 54. As described above in reference to FIG. 2, starter switch 20 has a 'Start' position, an 'On' position and an 'Off' position. When starter switch 20 is placed in the 'START' position, universal battery pack 12 provides low current power to starter solenoid 34 to start IC engine 14 as described above.

When IC engine 14 is running it turns PMG 52, which creates a 3-phase output. The 3-phase output is converted by the electronic converter circuit 54 to usable AC power that is provided to outlet 22. The electronic converter circuit 54 can be any suitable inverter circuit, such as the inverter circuit described in patent application Ser. No. 10/077,219, filed Feb. 15, 2002, entitled Alternator/Inverter With Dual H-Bridge, herein incorporated by reference in its entirety.

Figure 4:
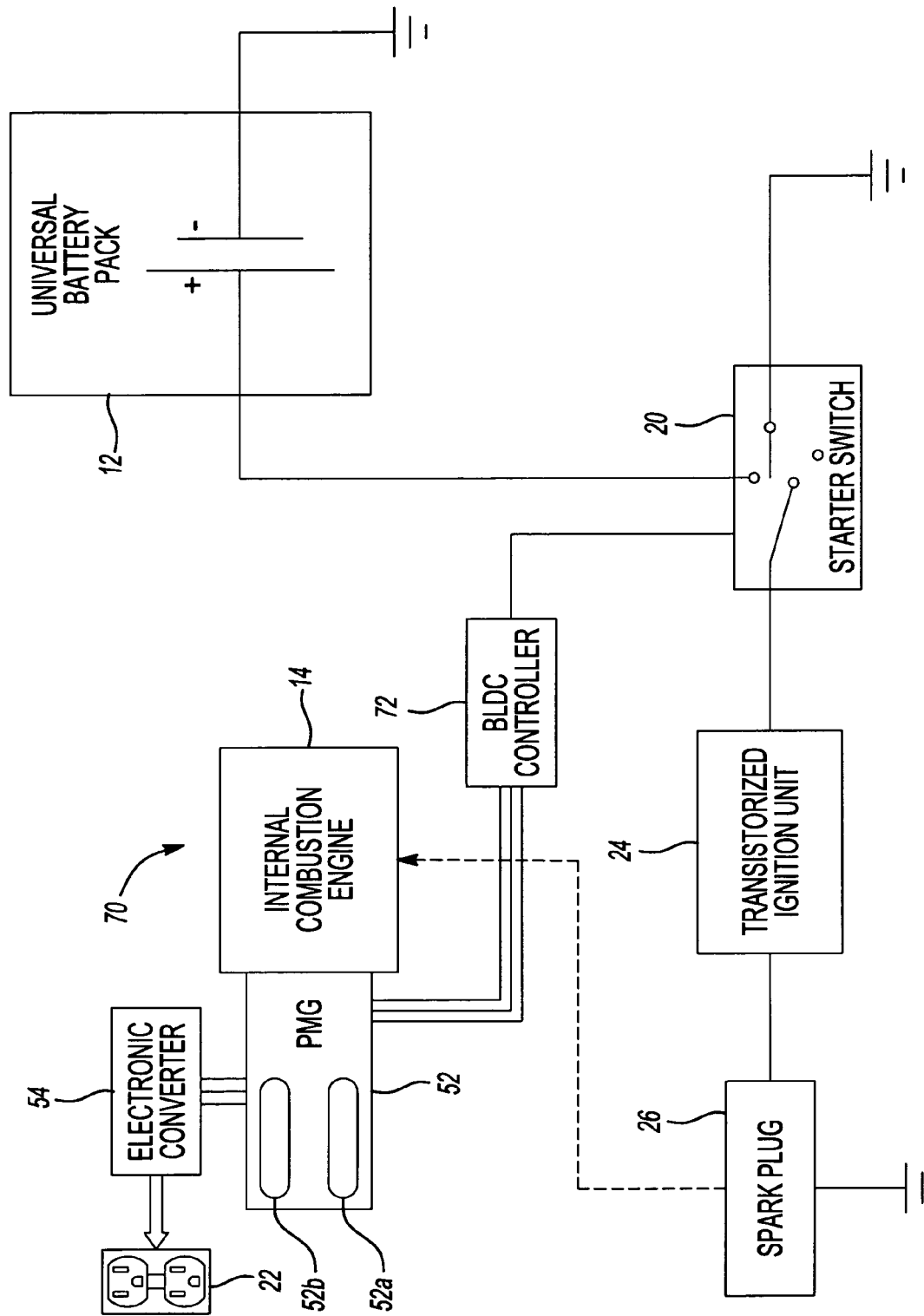
FIG. 4 is a simplified block diagram of yet another alternate embodiment of the portable generator system shown in FIG. 1 that utilizes a permanent magnet generator to start the IC engine.

FIG. 4 is a simplified block diagram of a portable generator system 70, which is yet another alternate embodiment of portable generator system 10 (shown in FIG. 1). In this embodiment, power generating device 16 again comprises PMG 52 and electronic converter circuit 54. Additionally, starting device 18 also comprises PMG 52. PMG 52 includes two sets of 3-phase windings, referred to herein as first windings 52a and second windings 52b. First and second windings 52a and 52b enable PMG 52 to be used as a starter motor for starting IC engine 14, i.e. 'Motor Mode', and a generator for generating AC power output to outlet 22, i.e. 'Generator Mode'. One set of first and second windings 52a, 52b is used to drive PMG 52 as an electric motor when PMG 52 is in the 'Motor Mode' and the other set of first and second windings 52a, 52b is used to generate power when PMG 52 is in the 'Generator Mode.'

Generator system 70 utilizes PMG 52 to start IC engine 14 and to generate AC power. Universal battery pack 12 is connected to PMG 52 via a brushless DC (BLDC) controller 72 and the starter switch 20. When PMG 52 is used in the 'Starter Mode', starter switch 20 is placed in the 'Start' position. Battery pack 12 then provides power to PMG 52, via BLDC controller 72, to drive PMG 52 as a brushless DC motor so that PMG 52 turns IC engine 14. As IC engine 14 turns, ignition unit 24 fires spark plug 26 at predetermined intervals. Each time spark plug 26 fires, spark is provided to IC engine 14. The spark is utilized to ignite the compressed fuel and air mixture present in the cylinder during the compression cycle of IC engine 14. Once the IC engine 14 is started, starter switch 20 is placed back to the 'On' position and IC engine 14 continues running. PMG 52 then stops functioning as a starter motor and switches to the 'Generator Mode'. Thus, PMG 52 begins to function as a generator. As described above in reference to FIG. 3 PMG 52 creates a 3-phase output that is converted by the electronic converter circuit 54 to usable AC power that is provided to outlet 22.

Figure 5:
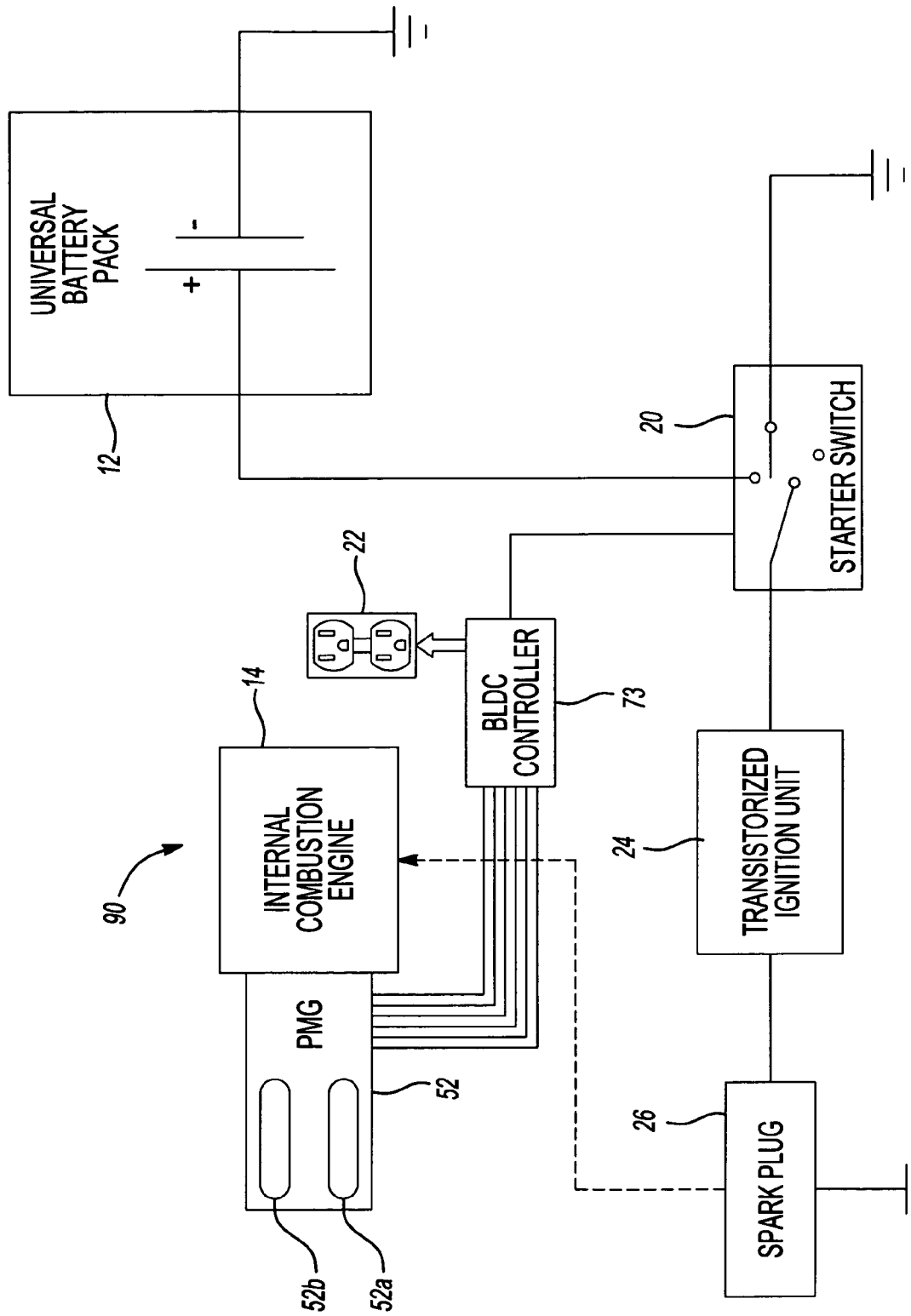
FIG. 5 is a simplified block diagram of still yet another alternate embodiment of the portable generator system shown in FIG. 1, that utilize the permanent magnet generator to start the IC engine.

FIG. 5 is a simplified block diagram of a portable generator system 90, which is still yet another alternate embodiment of portable generator system 10 (shown in FIG. 1). As in system 70, shown in FIG. 4, PMG 52 is used in the 'Motor Mode' to start IC engine 14 and used in the 'Generator Mode' to provide power to outlet 22. However, in this embodiment, the variable voltage, variable frequency power output by PMG 52 is converted to usable AC power, i.e., constant voltage, constant frequency AC power, utilizing BLDC controller 73.

Generator system 90 utilizes PMG 52 to start IC engine 14 and to generate AC power. As described above in reference to FIG. 4, universal battery pack 12 provides power to PMG 52, via BLDC controller 73, such that PMG 52 starts IC engine 14. Once the IC engine 14 is started, starter switch 20 is placed back to the 'On' position and IC engine 14 continues running. PMG 52 then stops functioning as a starter motor and switches to the 'Generator Mode' to provide power to outlet 22. More specifically, PMG 52 creates a 3-phase output. The 3-phase output is converted to AC power by a controlled full wave bridge rectifier circuit and H-bridge bridge circuit included in BLDC controller 73.

Figure 6:
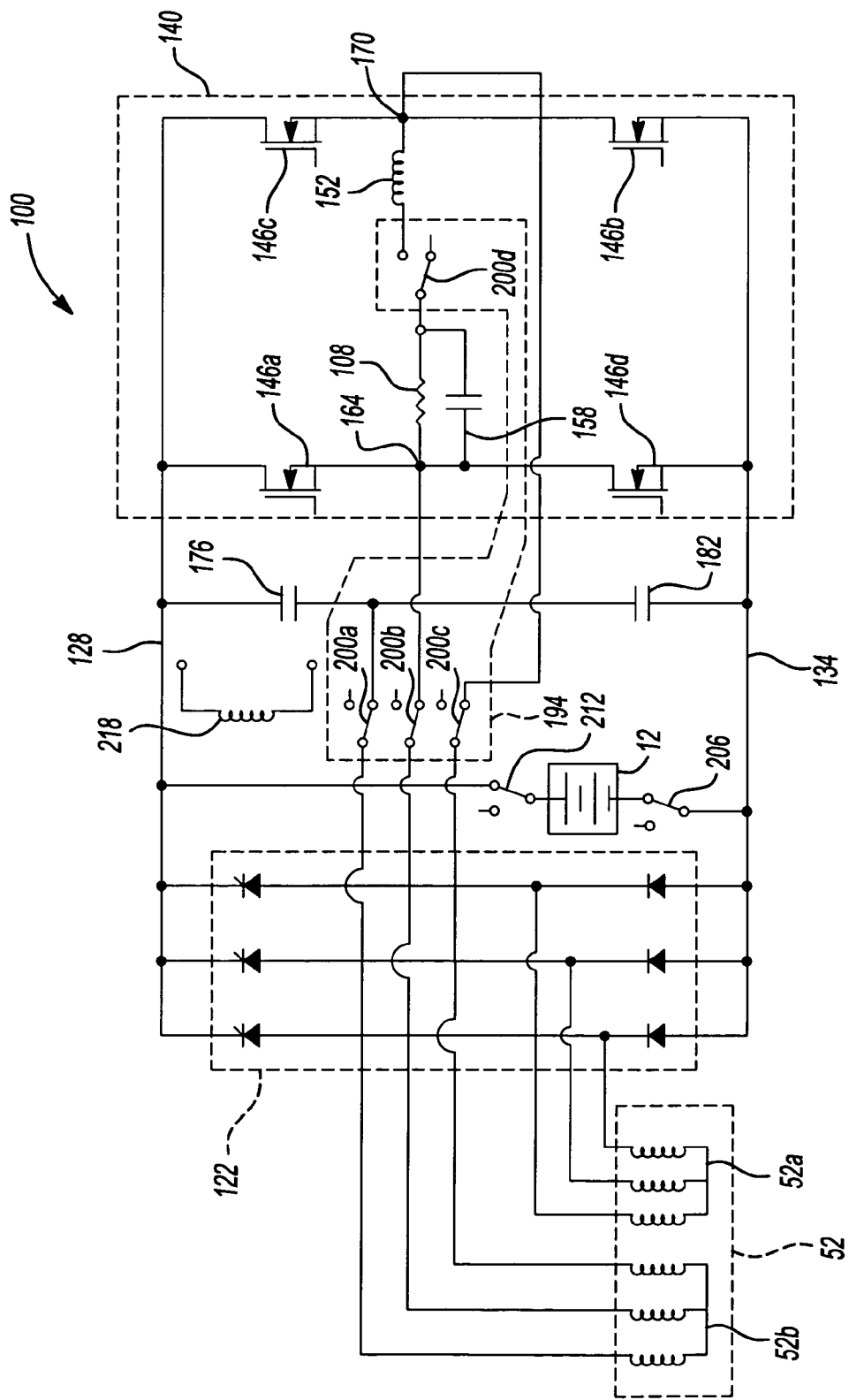
FIG. 6 is a simplified schematic drawing of an embodiment of a brushless DC drive circuit used in the portable generator system shown in FIG. 5.

FIG. 6 is an embodiment of a brushless DC drive circuit 100 included in BLDC controller 73 (FIG. 5). Circuit 100 is ideally suited for use in a portable electric power generator, however, it will be appreciated that the invention is not so limited and may find utility in a variety of related power generating applications.

Circuit 100 is electrically connected to PMG 52 (shown in FIG. 5) which is a three phase permanent magnet generator having first 3-phase windings 52a for running PMG 52 in the 'Generator Mode' and second 3-phase windings 52b for running PMG 52 in the 'Motor Mode'. In 'Generator Mode', PMG 52 outputs electrical power, such as to a load 108, while in 'Motor Mode' PMG 52 rotates IC engine 14 (shown in FIG. 5).

In 'Generator Mode', PMG 52 provides a three phase AC output signal to a controlled full wave bridge rectifier circuit 122. Rectifier circuit 122 is coupled across DC bus lines, or rails, 128 and 134 that form a DC bus. Also coupled across the DC bus is a full H-bridge circuit 140 comprising four identical power switching devices 146a-146d. An inductor 152 and a capacitor 158 are coupled across nodes 164 and 170 and form an LC filter for attenuating harmonic distortion in the output waveform generated by the H-bridge 140. Each of the power switching devices 146a-146d may comprise a variety of suitable power switching components, for example field effect transistors (FET's) or insulated gate bi-polar transistors (IGBT's). A pair of DC bus capacitors 176 and 182 are also coupled in series across the DC bus rails 128 and 134. Although the DC bus capacitance is shown to only include the pair of capacitors 176 and 182, it is envisioned that the DC bus capacitance could comprise any even number of capacitors. One phase of second windings 52b is connected at a center node between even numbers of the DC bus capacitors.

Load 108 is coupled in parallel across capacitor 158. Additionally, DC drive circuit 100 includes a 4-pole relay switch 194 that includes four poles 200a-200d and a coil 218. Universal battery pack 12 is removably inserted in series with key switches 206 and 212 between DC bus lines 128 and 134.

In starting operation, with 4-pole, double throw switch 194 de-energized, as shown, load 108 is disconnected and the three phases of second windings 52b are connected to center nodes 164 and 170 of H-bridge 140 and a center node 224 of the DC bus capacitance. With key switches 206 and 212 turned to a 'Start' position, portable universal battery pack 12 is connected across DC bus rails 128 and 134 and power switching devices 146a-146d are sequenced to run PMG 52 in the 'Motor Mode'. In this mode PMG 52 acts as a motor to turn IC engine 14. The power switching devices 146a-146d are sequenced by signals from a Hall effect position sensor (not shown) and coupled, via an AND gate (not shown), with a pulse width modulated (PWM) signal. Power switching devices 146a-146d create two phases of a three phase drive signal used to drive PMG 52 as a brushless DC motor with capacitors 176, 182 creating the third phase.

The PWM signal is based on the rated voltage output of universal battery pack 12. Thus, the rated voltage output of universal battery pack 12 need not conform to one predetermined DC voltage. The rated voltage output of universal battery pack 12 can be, for example, a voltage preferably of 12 volts or greater, preferably ranging from 12 to 18 volts. For example, a NiCd universal battery pack of 12, 14.4 or 18 volts can be utilized with circuit 100 and regardless of the output voltage, the effective voltage provided to PMG second windings 52b will be approximately equal to that of a 12 volt battery.

When the DC bus voltage exceeds the initial voltage of universal battery pack 12, for example 20 volts or greater, relay coil 218 is energized to disconnect second windings 52b from H-bridge circuit 140 and bus capacitors 176 and 182 and to connect load 108 to the output of H-bridge circuit 140. Once second windings 52b are disconnected from H-bridge circuit 140, PMG 52 is switched to 'Generator Mode'. In 'Generator Mode', PMG 52 outputs variable voltage, variable frequency AC power, via first windings 52a. Full wave bridge rectifier circuit 122 and H-bridge circuit 140 convert the AC power to a constant voltage, constant frequency output, for example a 120 VAC, 60 Hz, that is output from H-bridge circuit 140 to load 108.

Utilizing universal battery pack 12 and PMG 52 to provide starting power to IC engine 14 greatly reduces the size and weight of generator system 90. It is envisioned that universal battery pack 12 can be any universal battery pack commonly used in many cordless power tools, for example the DEWALT XR PLUS (Extended Run Time Plus) line of batteries.

Figure 7:
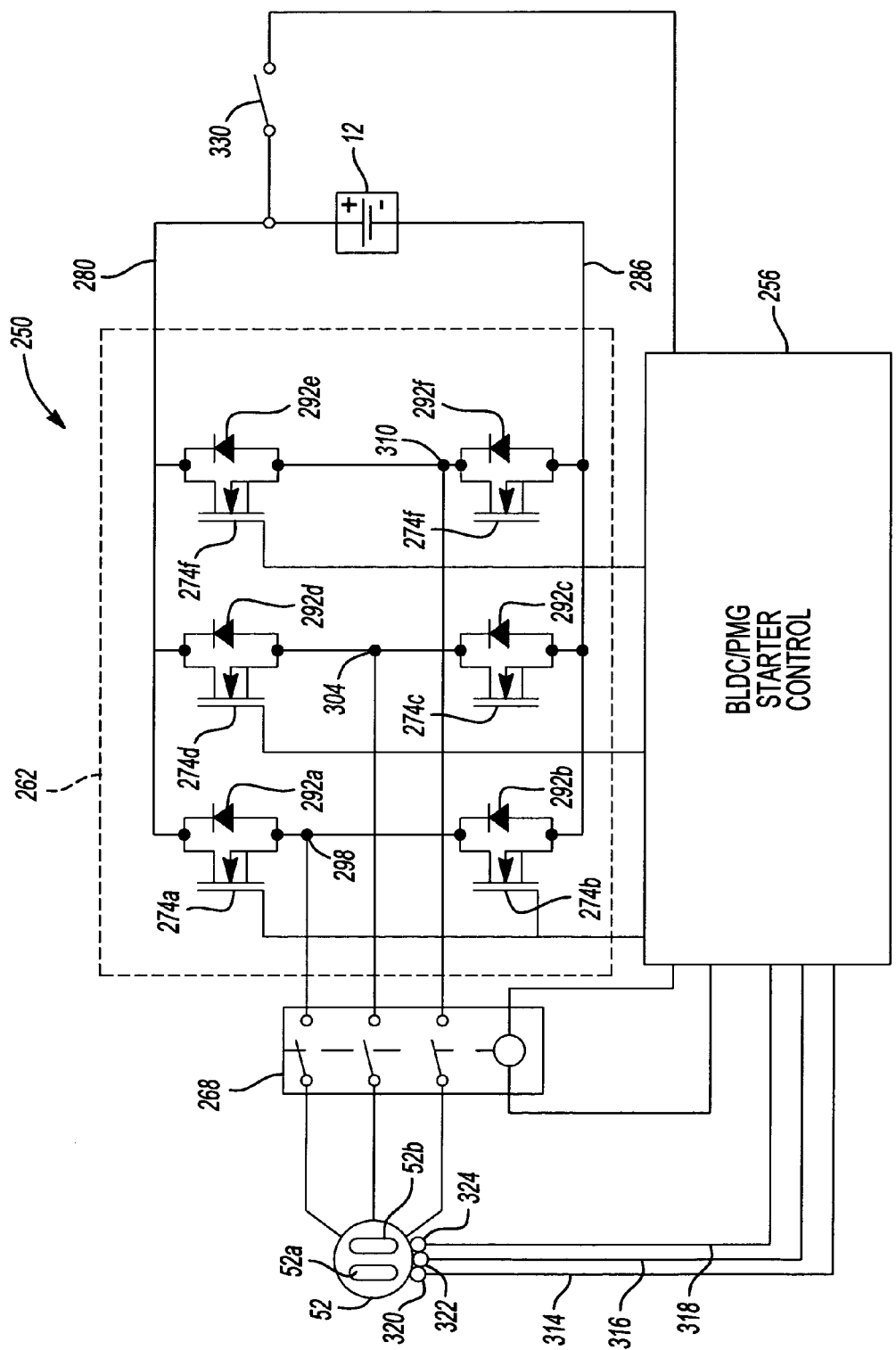
FIG. 7 is a simplified schematic drawing of another embodiment of a brushless DC drive circuit used in the portable generator system shown in FIG. 4.

FIG. 7 is a simplified schematic drawing of a preferred embodiment of a brushless DC motor drive circuit 250 included in BLDC controller 72 used in portable generator system 70 (shown in FIG. 4). Drive circuit 250 is used to drive PMG 52 as a brushless DC motor to start IC engine 14 (shown in FIG. 4). Circuit 250 is a low voltage DC to AC 3-phase inverter that incorporates a Brushless DC/Permanent Magnet Generator (BLDC/PMG) starter control 256, and is powered directly by universal battery pack 12. DC drive circuit 250 includes a power stage 262 that is electrically connectable to PMG 52 through a 3-pole relay switch 268. Power stage 262 includes six identical power switching devices 274a-274f coupled across DC bus lines, or rails, 280 and 286.

Power switching devices 274a and 274b are connected in series between bus lines 280 and 286 having a center node 298 electrically connected to one pole of relay 268. Power switching devices 274c and 274d are connected in series between bus lines 280 and 286 having a center node 304 electrically connected to a second pole of relay 268. Power switching devices 274e and 274f are similarly connected in series between bus lines 280 and 286 having a center node 310 electrically connected to a third pole of relay 268. Six diodes 292a-292f are respectively connected in parallel with switching devices 274a-274f, between bus lines 280 and 286. Switching devices 274a-274f may comprise a variety of suitable power switching components, for example field effect transistors (FET's), insulated gate bi-polar transistors (IGBT's), or metal oxide silicon field effect transistors (MOSFET's).

The 3-phase PMG 52 includes position sensors 320, 322 and 324, which are illustratively Hall effect sensors, that are connected to BLDC/PMG starter control 256 by lines 314, 316 and 318, respectively. Position sensors 320, 322, 324 sense the position of a rotor (not shown) of PMG 52. Additionally, DC drive circuit 250 includes a momentary starter switch 330 that controls the flow of current from universal battery pack 12 to BLDC/PMG starter control 256.

In operation, initially IC engine 14 is at rest. The IC engine 14 is started by a user closing momentary start switch 330. The BLDC/PMG starter control 256 will then become energized by universal battery pack 12. Provided the position sensors 320, 322 and 324 indicate that either the speed of IC engine 14 or the speed of PMG 52 is less than a predetermined value, e.g. 600 rpm, 3-pole relay switch 268 will be energized by BLDC/PMG starter control 256, thereby connecting the 3-phase power stage 262 to PMG 52. Utilizing information from position sensors 320, 322 and 324, the switching devices 274a-274f are turned on and off by BLDC/PMG starter control 256. The switching of switching devices 274a-274f electronically commutates second 3-phase windings 52b within PMG 52 to drive PMG 52 as a brushless DC motor to rotate IC engine 14 to start it.

Thus, when PMG 52 is in 'Motor Mode', IC engine 14 will be turned by PMG 52 acting as a motor and will accelerate up to a speed to start IC engine 14. Once IC engine 14 has started, PMG 52 is driven past a predetermined maximum speed, e.g. 600 rpm, and 3-pole relay switch 268 will then be de-energized, thereby disconnecting power stage 262 from PMG 52. Disconnecting power stage 262 avoids overdriving universal battery pack 12 and supplying excessive voltage to switching devices 274a-274f. Once the starting operation is complete, momentary starter switch 330 is opened.

BLDC/PMG starter control 256 can be microprocessor based to simplify the electronic circuitry and to provide additional control features. Additional control features may include setting a maximum cranking time, e.g. 5 seconds, to avoid damage if momentary starter switch 330 is held closed for too long, or not attempting starting of IC engine 14 when universal battery pack 12 does not have sufficient voltage to turn or start IC engine 14. Further control features provided by a microprocessor based BLDC/PMG starter control 256 may include speed detection and control of 3-pole relay switch 268 to avoid overdriving universal battery pack 12 and power stage 262. Even further control features may include setting an upper starting speed of PMG 52 regardless of the voltage of universal battery pack 12 by utilizing pulse width modulation control of switching devices 274a-274f above a minimum speed.

In an alternate embodiment, PMG 52 includes a single set of tapped windings. In this embodiment, the first windings 52a comprise the full windings, which are used to generate AC power in the 'Generator Mode'. The second windings 52b comprise the tapped portion of the windings, which are used to drive PMG 52 as a motor in the 'Motor Mode' to start the IC engine 14.

Although the present invention has been shown and described in connection with a portable generator using a single PMG and a single alternator/inverter circuit, or a single brushless DC drive circuit, the present invention could just as readily be adapted for use with starter systems of portable generators utilizing a pair of PMG's and a pair of alternator/inverter circuits. Alternatively, the present invention could be used with a portable generator using a pair of PMG's with a pair of brushless DC motor drive circuits, such as that described in patent application Ser. No. 10/077,386, filed Feb. 15, 2002, entitled Alternator/Inverter With Dual H-Bridge and Automatic Voltage Regulation, herein incorporated by reference in its entirety. The invention is further applicable to all types of small IC engines, for example a lawnmower engine. Thus, the scope of the invention should not be construed as being limited only to portable generators.

The present invention thus provides a means for starting an internal combustion engine utilizing a universal battery pack, wherein the universal batter pack is able to be used with other cordless power tools. Also, by controlling an H-Bridge switching circuit in a predetermined switching sequence, the H-Bridge can be used to control the application of power to a PMG to enable the PMG to be effectively used as a starter motor to start the internal combustion engine.

Figure 8:
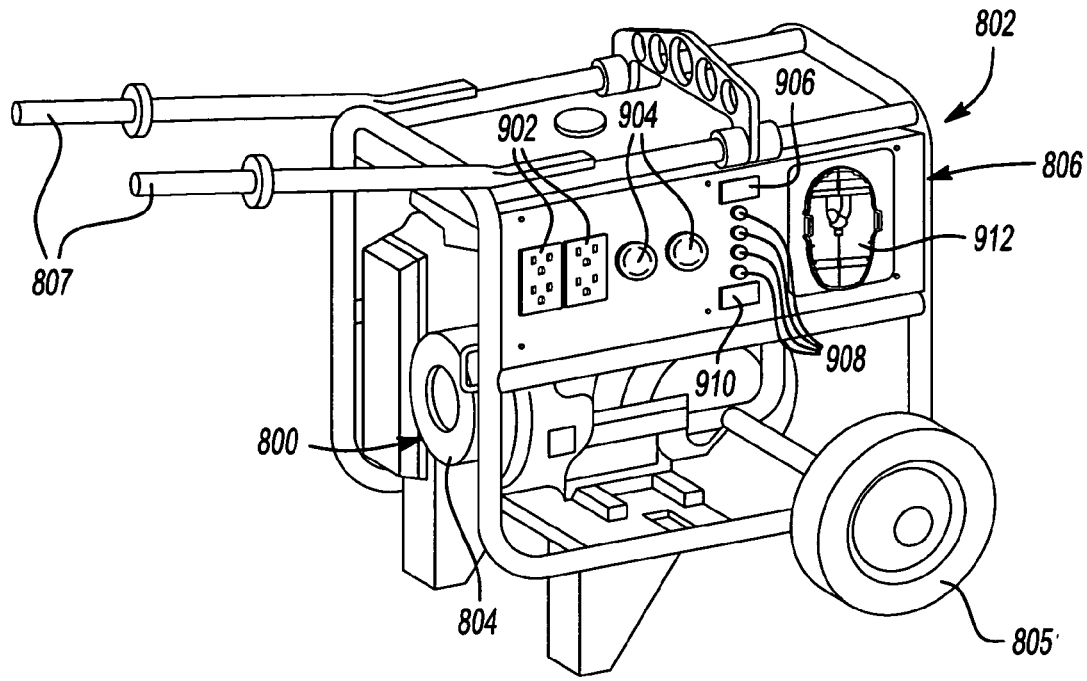
FIG. 8 is a side perspective view of a portable generator in accordance with an aspect of the invention.

FIG. 8 shows a portable generator 800 in accordance with an aspect of the invention. As used herein, a portable generator has an electric generator device for generating AC power that is driven by an internal combustion engine and is sufficiently light that it can be manually moved from one place to another. Portable generator 800 includes a frame 802 that supports an internal combustion engine 804. Frame 802 may illustratively support wheels 805 (only one of which is shown in FIG. 8) and include handles 807 to facilitate manually moving portable generator 800. An electric generator device (hidden from view in FIG. 8) is coupled to an output shaft of internal combustion engine 804. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz.

Figure 9:
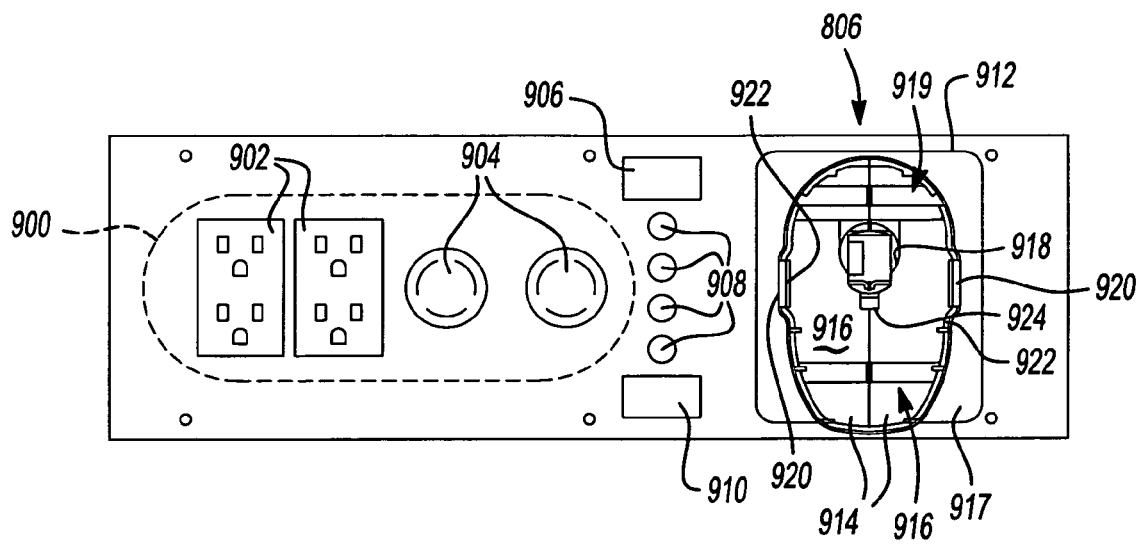
FIG. 9 is a front view of a control panel of the portable generator of FIG. 8.
Figure 10:
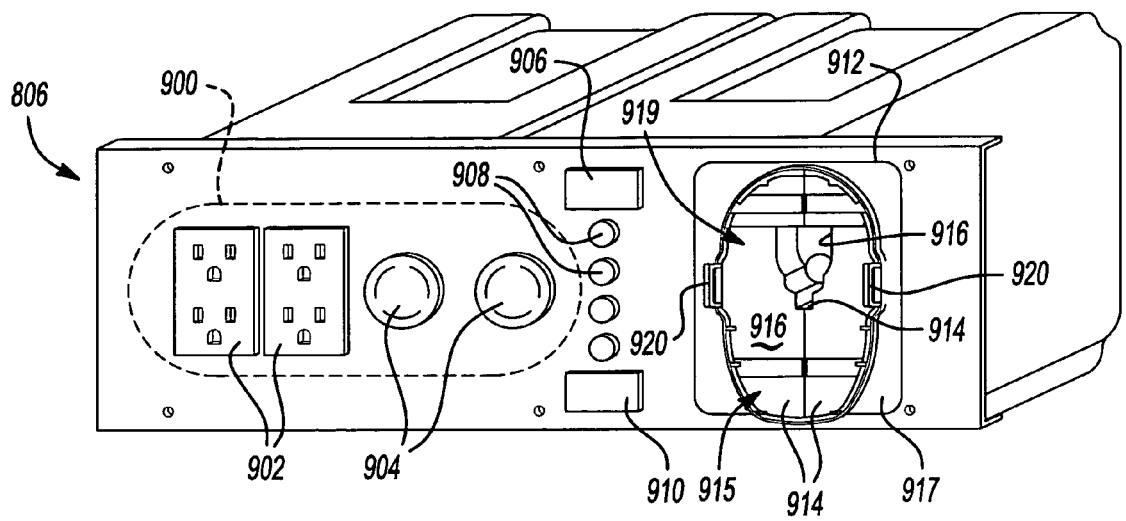
FIG. 10 is a front perspective view of the control panel of FIG. 9.

Portable generator 800 further includes a control panel 806, shown in more detail in FIGS. 9 and 10. Referring to FIGS. 9 and 10, control panel 806 includes AC outlets 900. AC outlets 900 illustratively include ground fault interrupter outlets 902 and twist-lock outlets 904. Control panel 806 also includes on/off/start switch 906, circuit breakers 908, and idle speed control switch 910. Control panel 806 further includes battery receptacle 912 electrically coupled to an electrically powered starting device for starting internal combustion engine 804, such as the starting devices described above.

Figure 11:
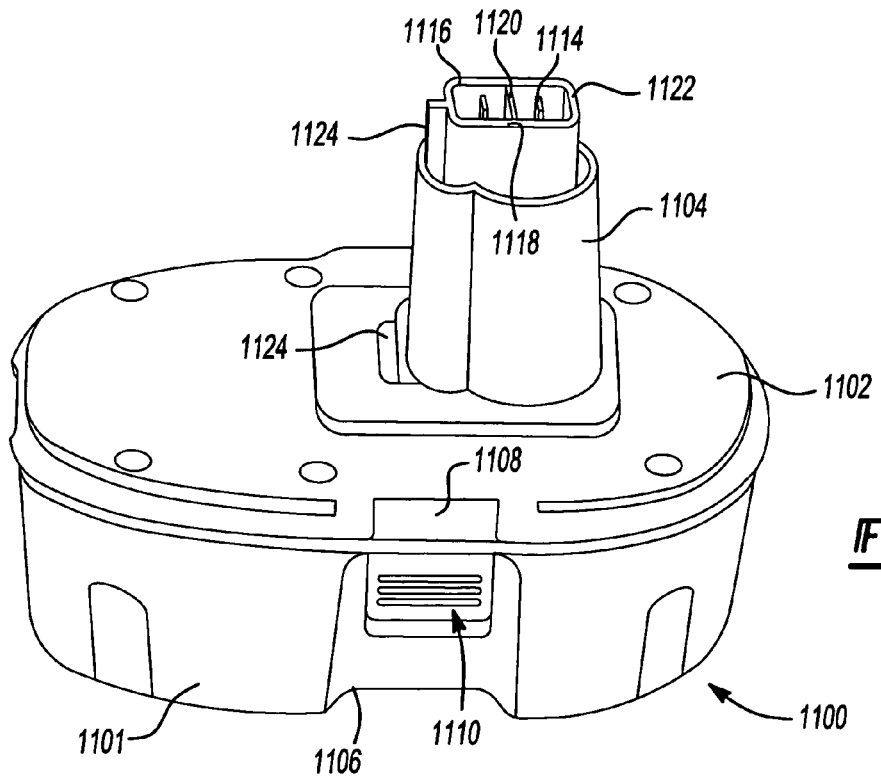
FIG. 11 is a side perspective view of a battery pack.
Figure 15:
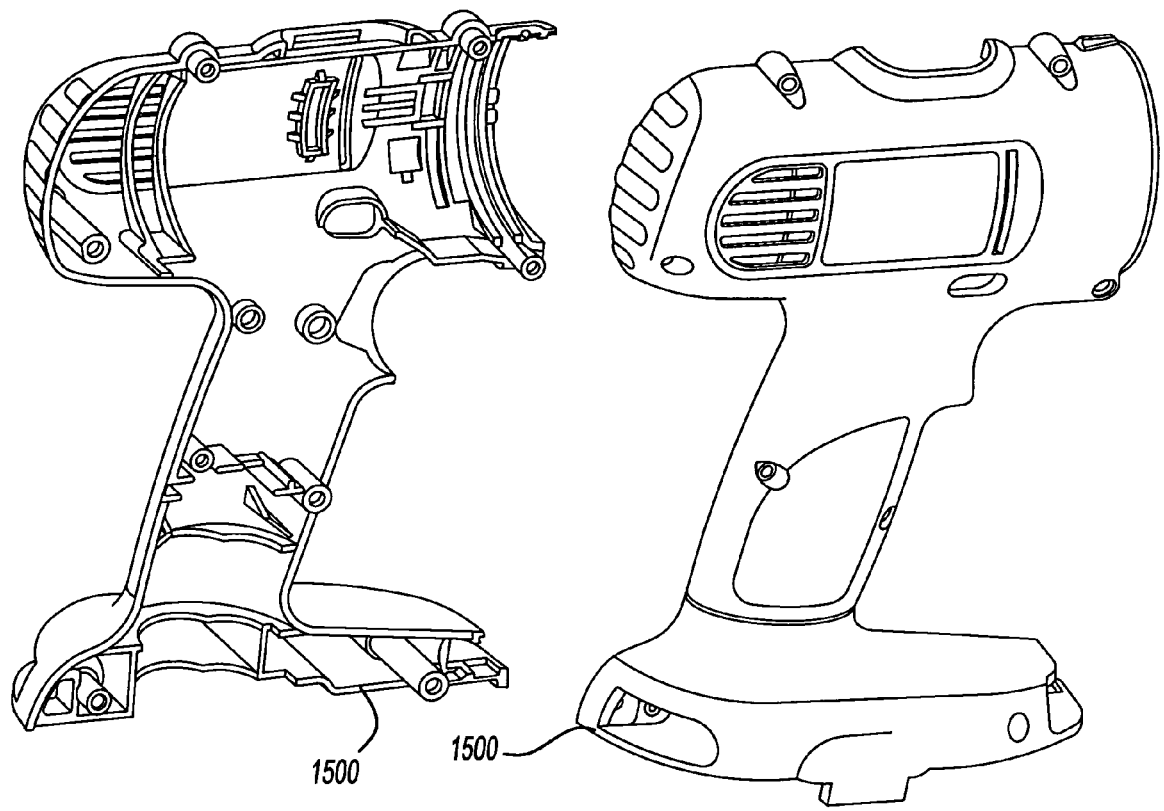
FIG. 15 is a side perspective view of housing halves of a cordless drill.

Battery receptacle 912 may illustratively be a "foot" of a cordless power tool that receives a battery pack, such as battery pack 1100 (FIG. 11). As used herein, a "foot" of a cordless power tool is that portion of the power tool, typically part of the power tool's housing, that is configured to receive a battery pack. For example, battery pack 1100 may be a battery pack for the DEWALT series of 18 volt cordless power tools and battery receptacle 912 would then illustratively be materially the same as the foot of these power tools, such as the DEWALT DW959K-2 drill. FIG. 15 shows housing halves 1500 of the DEWALT DW959K-2 drill, the lower portions of which comprise the foot of this cordless power tool. It should be understood, however, that battery receptacle 912 could be the foot of any cordless power tool that uses a removable battery pack.

With reference to FIGS. 9-12, battery receptacle 912 illustratively includes housing halves 914 mated together to form a housing 915. A collar 917, illustratively a rectangular shaped collar, surrounds housing 915 and includes screw posts 1200 (only one of which is shown in FIG. 12) for receiving screws which secure collar 917 to control panel 806. Housing 915 includes a base portion 919 having an outer plate 916 that conforms to an upper plate 1102 of battery pack 1100 (FIG. 11) and a columnar portion 1218 (FIG. 12) extending from base portion 919. Opposed flanges 1214 (FIG. 12) project outwardly from housing halves 914 at opposed edges of outer plate 916. Opposed flanges 1214 include slots 1216 therein that mate with inwardly extending projections 1300 (FIG. 13) of collar 917 to secure housing 915 to control panel 806 when collar 917 is secured to control panel 806.

Housing 915 has a bore or passageway 918 therein that conforms to a tower 1104 of battery pack 1100 that extends from a base 1101 of battery pack 1100. Battery receptacle 912 further includes opposed catches 920 at opposed sides of outer plate 916 which mate with latches 1106 (only one of which is shown in FIG. 11) of battery pack 1100. Catches 920 illustratively include slots 922 that receive projections 1108 of latches 1106 of battery pack 1100. It should be appreciated that latches 1106 of battery pack 1100 are spring latches in which buttons 1110 of latches 1106 are depressed to retract projections 1108 from slots 922 of catches 920. Housing 915 of battery receptacle 912 further includes a keyway 924 in outer plate 916 projecting from bore 918 that receives a key 1124 at the base of tower 1104 of battery pack 1100.

Battery receptacle 912 further includes a connector 1202 (FIG. 12) that mates with terminal block 1112 of battery pack 1100. Connector 1202 is electrically coupled to a starting device for internal combustion engine 804 in a manner similar to that described above. Terminal block 1112 of battery pack 1100 includes power terminals 1114, 1116, temperature sense terminal 1118 (which is connected to a temperature sensing element within battery pack 1100 such as a thermistor) and key 1120 surrounded by a rectangular wall 1122 having a key 1124 projecting outwardly from an end wall. Connector 1202 has corresponding power terminals 1204, 1206. Terminals 1204, 1206 are spaced from each other and have a space 1208 therebetween which receives temperature sense terminal 1118 and key 1120. Terminals 1204, 1206 are surrounded by a rectangular wall 1210. It should be understood that connector 1202 could have a female temperature sense terminal (not shown) if generator 800 includes circuitry to sense the temperature of battery pack 1100.

Housing halves 914 include opposed channels 1208 that receive opposed flanges of connector 1202 to mount connector 1202 in housing 915.

By providing on control panel 806 a battery receptacle 912 that is essentially a foot of a cordless power tool, a user of generator 800 can advantageously use the battery pack for the cordless power tool, such as battery pack 1100, in starting generator 800. Illustratively, battery pack 1100 is not charged by generator 800. Rather, when battery pack 1100 needs charging, it is charged in an external charger, such as the external charger that is typically provided with the cordless power tool when the user purchases the cordless power tool.

By using a battery pack from a cordless power tool, such as battery pack 1100, generator 800 does not require its own battery, which is typically a lead acid type of battery. The user need not purchase the lead acid battery, avoids the need to maintain such a lead acid battery, and generator 800 is lighter since the weight of the lead acid battery is eliminated.

FIG. 14 shows another aspect of the invention. In the embodiment of FIG. 14, a portable electric generator 1400 includes a frame 1402 that supports an internal combustion engine 1404. Frame 1402 may illustratively support wheels 1401 (only one of which is shown in FIG. 8) and include handles 1403 for facilitating moving generator 1400. An electric generator device (hidden from view in FIG. 14) is coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1400 also includes a control panel including AC outlets (not shown in FIG. 14).

Generator 1400 further includes enclosure 1406 mounted to frame 1402. Enclosure 1406, which may illustratively be a water resistant enclosure, includes a rectangular tub shaped base portion 1408 and hinged lid 1410. Base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

Charger 1414 may illustratively be a stand alone charger such as the charger that is typically supplied with the power tool when the user purchases the power tool and is thus mounted in base portion 1408 of enclosure 1406 and plugged into AC outlet 1416 in enclosure 1406. Charger 1414 may illustratively be a multi-port charger having a plurality of ports to that charger 1414 can receive a plurality of battery packs 1100 at any one time to charge them simultaneously. Battery receptacle 1412 is electrically coupled to an electrically powered starting device for starting internal combustion 1404, such as the starting devices described above.

In use, a battery pack, such as battery pack 1100, from a cordless power tool is placed in battery receptacle 1412 and provides electrical power to start internal combustion engine

1404. Charger 1414 is used to charge one or more battery packs 1100. In this regard, once internal combustion engine 1404 is started, the battery pack 1100 in battery receptacle 1412 can be removed from battery receptacle 1412 and placed in charger 1414 to charge that battery pack 1100.

Internal combustion engine 1404 may have a pull start that can be used to start internal combustion engine 1404 as well as the electrical starter circuit described above. The pull start could then be used to start internal combustion engine 1404 when the battery pack 1100 is discharged. Battery pack 1100 can then be placed in charger 1414, charged, and then placed in battery receptacle 1412 to provide electrical power to the electrical starting device so that internal combustion engine can be electrically started.

Figure 16:
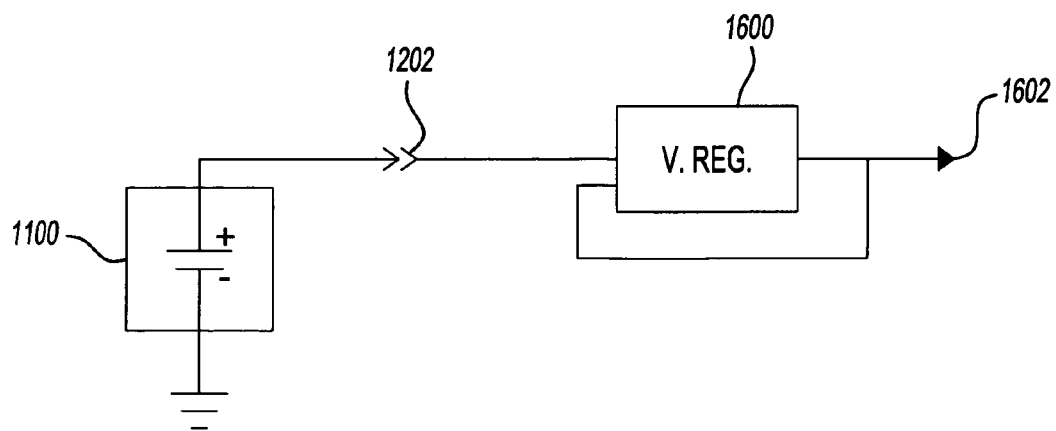
FIG. 16 is a schematic showing a voltage regulation circuit coupling the battery receptacle of the portable generator of FIG. 8 to the starting device of the portable generator of FIG. 8.

In an aspect of the invention, portable generator 800 is adapted to use universal battery packs having different voltages. More specifically with reference to FIG. 16, portable generator 800 includes a voltage regulation circuit 1600 that couples connector 1202 of battery receptacle 912 to the starting device for internal combustion engine 804, thus coupling the output of battery pack 1100 to the starting device for internal combustion engine 804 when battery pack 1100 is received in battery receptacle 912. Voltage regulation circuit 1600 illustratively provides at its output 1602 a set voltage at the appropriate level for the starting device for internal combustion engine 804. For example, if the starting device for internal combustion engine 804 utilizes a 12 volt DC starter motor, then voltage regulation circuit 1600 provides 12 volts DC at its output 1602. Voltage regulation circuit 1600 may illustratively monitor the voltage at its output 1602 and adjust its output accordingly to maintain the appropriate voltage level.

Voltage regulation circuit 1600 may be any known type of voltage regulation circuit. It may, for example, be a DC-DC converter in which the switching device(s) in the DC-DC converter are switched with a pulse width modulated signal and the duty cycle of the pulse width modulated signal is controlled to obtain the desired voltage level at output 1602. That is, voltage regulation circuit 1600 compares the voltage at its output 1602 with the desired voltage and adjusts the duty cycle of the PWM signal to maintain the output voltage constant at the desired level.

Voltage regulation circuit 1600 may illustratively be a buck converter type of DC-DC converter. Since buck converters are step-down converters, the starter motor used would then illustratively be a low voltage starter motor such that the voltage of the starter motor is no greater than the lowest voltage universal battery pack utilized. Alternatively, voltage regulation circuit 1600 may illustratively be a boost converter type of DC-DC converter. Since boost converters are step-up converters, the starter motor used would then illustratively be a higher voltage starter motor such that the voltage of the starter motor is no lower than the highest voltage universal battery pack utilized. Voltage regulation circuit 1600 may also illustratively be a buck-boost type of DC-DC converter which can both step-up and step-down. The starter motor utilized can then have a voltage that falls between the voltage of the highest voltage universal battery pack utilized and the voltage of the lowest voltage universal battery pack utilized. It should be understood that generator 1400 can similarly have voltage regulation circuit 1600.

Figure 17:
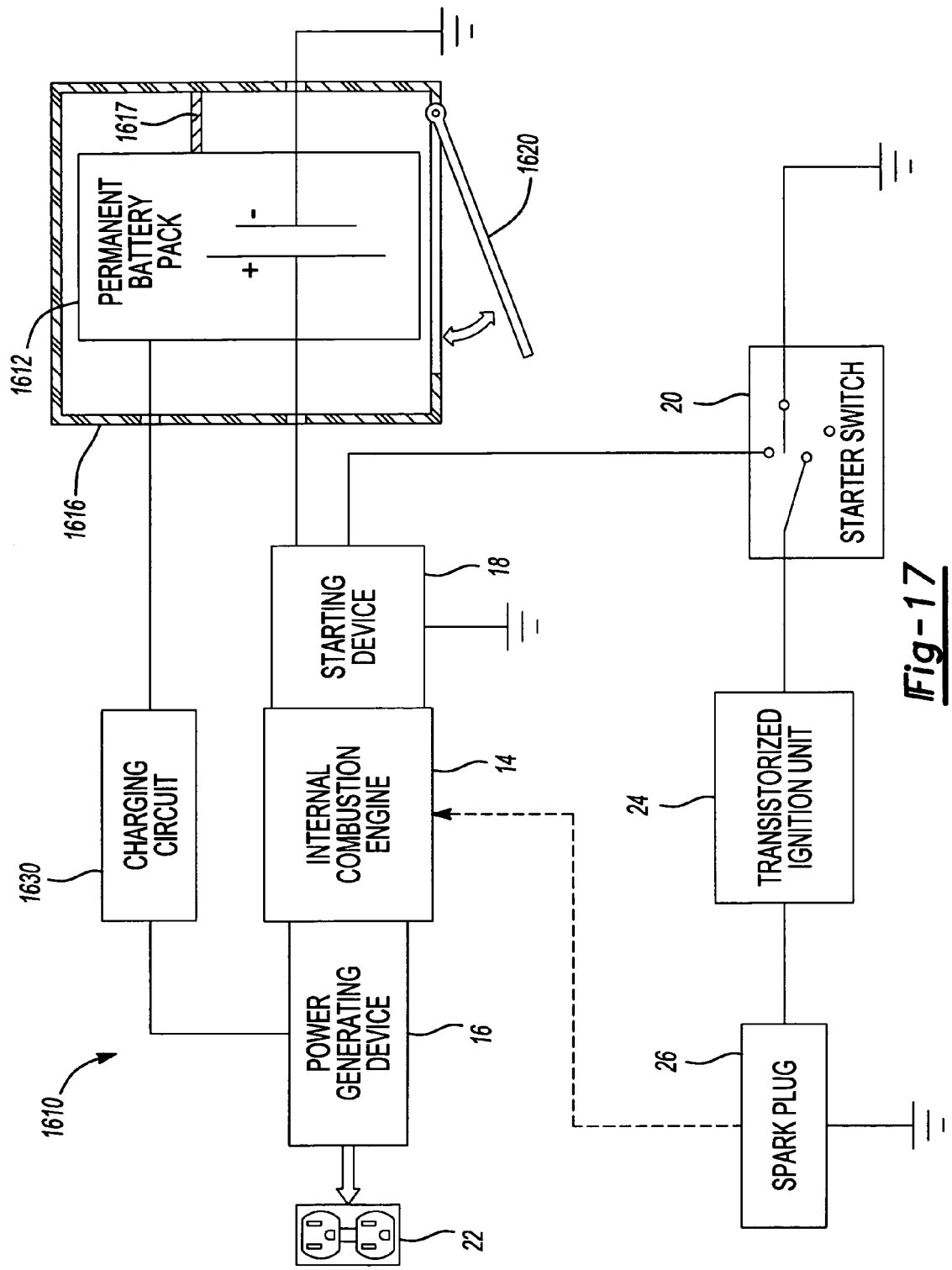
FIG. 17 is a simplified block diagram of a portable generator system, in accordance with another alternate embodiment of the present invention, wherein the system utilizes a permanently mounted universal battery pack to start an internal combustion engine of the generator system.

With reference now to FIG. 17, a simplified block diagram of a portable generator system 1610, according to additional features is shown. The generator system 1610 utilizes a battery pack 1612 that is mounted to generator system 1610 with fastening devices, such as one or more hold down members shown representatively by 1617. Hold down member(s) 1617 may be removably affixed to housing 1616 such as with screws (not shown). Battery pack 1612 is thus "permanently mounted" in housing 1616 in the sense that it is not easily removable by hand. But battery pack 1612 can be removed and replaced in the event of failure, such as by unfastening hold down member(s) 1617, removing and replacing back pack 1612, and refastening hold down member(s) 1617. Battery pack 1612 may comprise a battery pack such as the battery pack 1100 (FIG. 11). Further, battery pack 1612 may comprise any suitable battery pack such as a NiCad universal battery pack of 12, 14.4 or 18 volts. In this example however, the battery pack 1612 is permanently mounted within a housing 1616 mounted in a frame of generator system 1610, such as frame 1402 (FIG. 14). The housing 1616 may define similar components as described with respect to the enclosure 1406 (FIG. 14), but in this example, the housing 1616 surrounds the battery pack 1612. The housing 1616 may include any suitable containment structure. It is contemplated that the housing 1616 may provide a removable portion, such as a door or cover plate 1620 to gain access to the battery pack 1612 in the event the battery pack 1612 needs to be replaced. In one example, the cover plate 1620 may be removably secured to the housing 1616, such as by fasteners (not shown).

According to an additional feature of the generator system 1610 shown in FIG. 17, a charging circuit 1630 may be provided. The charging circuit 1630 may be electrically connected to the power generating device 16 whereby the power generating device may provide the charging circuit with power to charge the battery pack 1612. It should be appreciated that while the charging circuit 1630 is specifically illustrated for use with the generator system 1610, it may easily be adapted for use in any of the generator systems disclosed herein. Charging circuit 1630 would illustratively be switched off during starting internal combustion engine 10 of generator system 1610 and then switched on after internal combustion engine 10 is started.

The generator system 1610 utilizes battery pack 1612 to start the IC engine 14 that turns the power generating device 16. The generator system 1610 may additionally include a starting device 18 connected to the battery pack 1612 and the starter switch. The starting device 18 may comprise any suitable starting device such as a starter motor and starter solenoid (see e.g., FIG. 2). The starter switch 20 may be connected to the transistorized ignition unit 24, which is in turn connected to a the spark plug 26. The starting device 18 may be used to turn the IC engine 14 at a rate sufficient to start the IC engine 14. Once the IC engine 14 is started, the IC engine 14 drives power generating device 16. The power generating device 16 may output AC power usable by a load connected to the electrical outlet. Concurrently, the power generating device may provide power to the charging unit 1630 to charge the battery pack 1612. The power generator device may alternatively comprise a generator alternator (FIG. 2).

Figure 18:
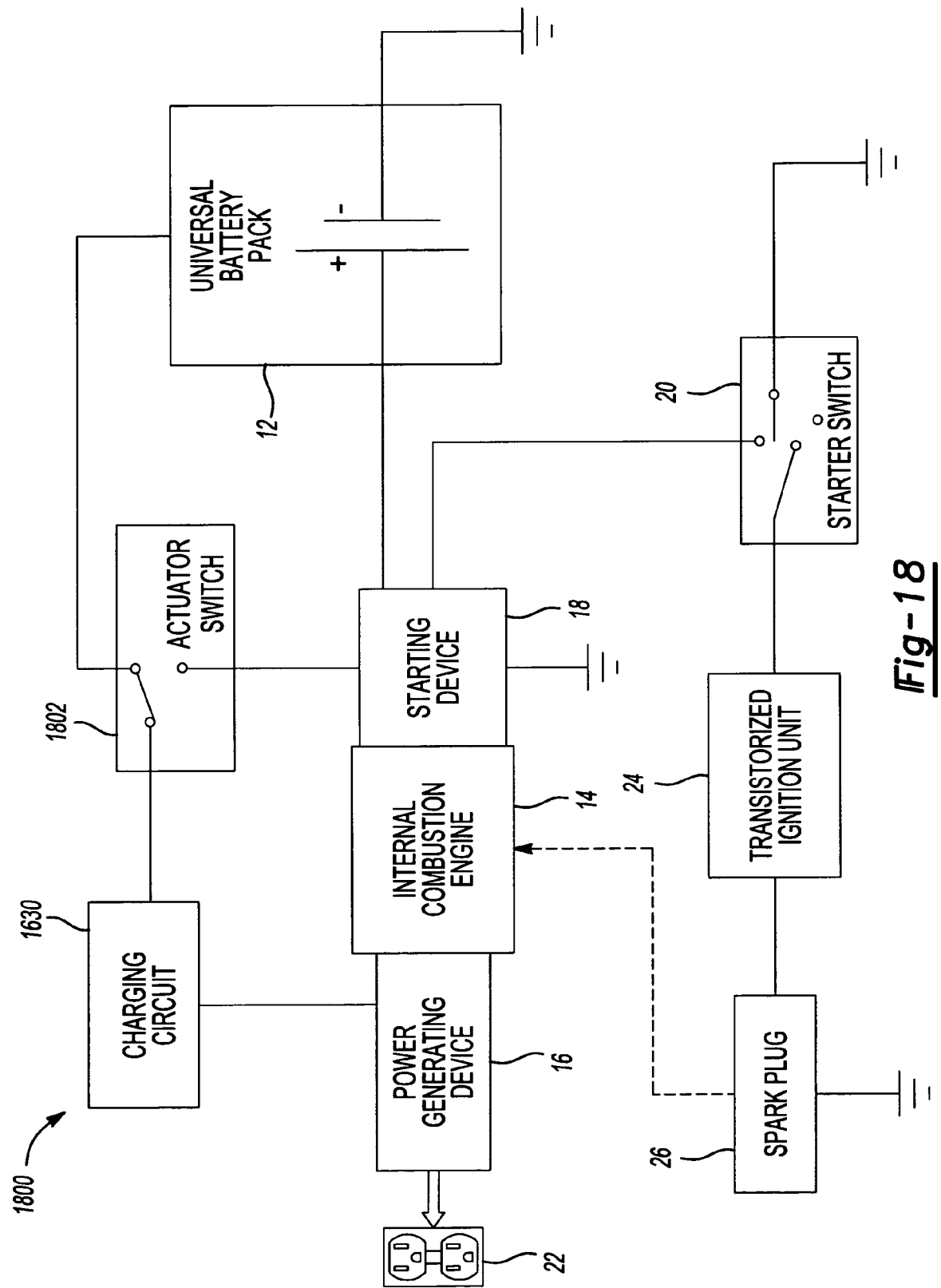
FIG. 18 is a simplified block diagram of a portable generator system, in accordance with another alternate embodiment of the present invention, wherein the system utilizes an actuator switch for connecting a portable universal battery pack to either a starting device to start an internal combustion engine of the generator system or to a charging circuit for charging the portable universal battery pack.

With reference now to FIG. 18, a simplified block diagram of a portable generator system 1800, according to additional features is shown. The portable generator system 1800 includes an actuator switch 1802. The actuator switch 1802 is switchable to provide electrical connection between the universal battery pack 12 and the starting device 18 or between universal battery pack 12 and the charging circuit 1630. In this example, a user may place the universal battery pack 12 into the battery receptacle (such as battery receptacle 912, FIG. 9) and switch the actuator switch to a 'Start' position, thereby electrically coupling the universal battery pack 12 to the starting device 18. Once the actuator switch is in the 'Start' position, the starter switch 20 may also be placed into the 'Start' position such that the universal battery pack 12 provides power to the starting device 18 (such as a starter solenoid 34, FIG. 2). While the universal battery pack 12 has been shown, it is appreciated that alternatively, the permanently mounted battery pack 1612 in housing 1616 (FIG. 17) may be used.

Once the IC engine 14 is started, the spring loaded starter switch 20 may return to the 'ON' position. In the 'ON' position, the starter switch may direct power from the ignition unit 24 to the spark plug 26. Each time spark plug 26 fires, spark is provided to IC engine 14, which is utilized to ignite a compressed fuel and air mixture present in a cylinder (not shown) during a compression cycle of IC engine 14. When IC engine 14 is running it turns alternator 36, which creates an output voltage usable to provide AC power at outlet 22.

In addition, once the IC engine 14 has been started, the actuator switch 1662 may be moved to a 'Charge' position. In the 'Charge' position, the actuator switch 1802 may electrically connect the charging circuit 1630 to universal battery pack 12 to charge the universal battery pack 12. It is contemplated that the actuator switch 1802 may be spring-loaded so that it returns to the 'Charge' position upon successfully starting the IC engine 14. It is also contemplated that the operation of the actuator switch 1802 and the starter switch 20 may be combined into a single switch. In this way, a single start switch of the generator system 1800 may be wired such that charging is deactivated when the start switch is turned to the 'Start' position and then reactivates charging when the momentary start switch is released.

Figure 19:
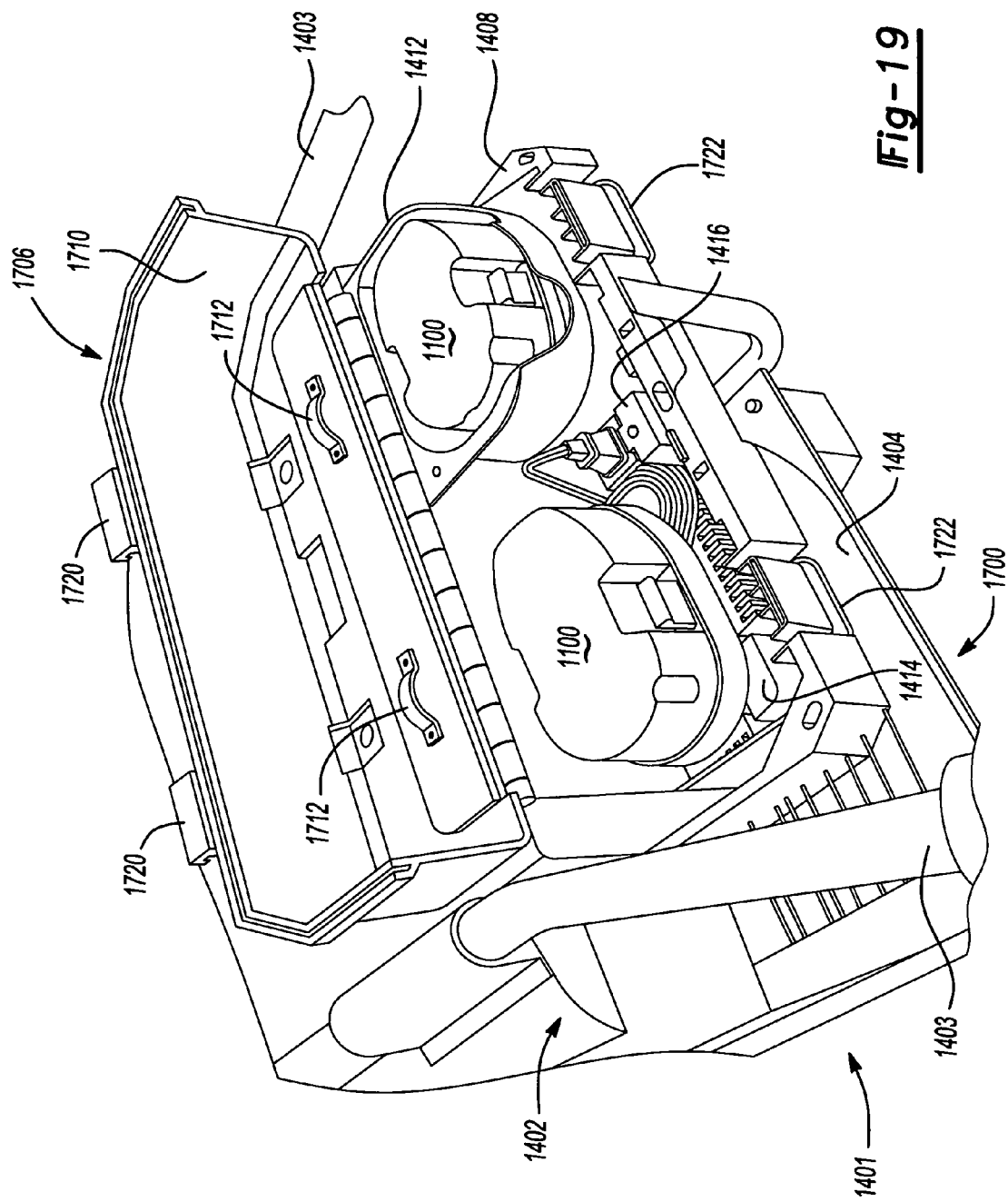
FIG. 19 is a side perspective view of the portable generator of FIG. 14 shown with biasing elements in a lid of a battery pack/charger enclosure according to another embodiment.
Figure 20:
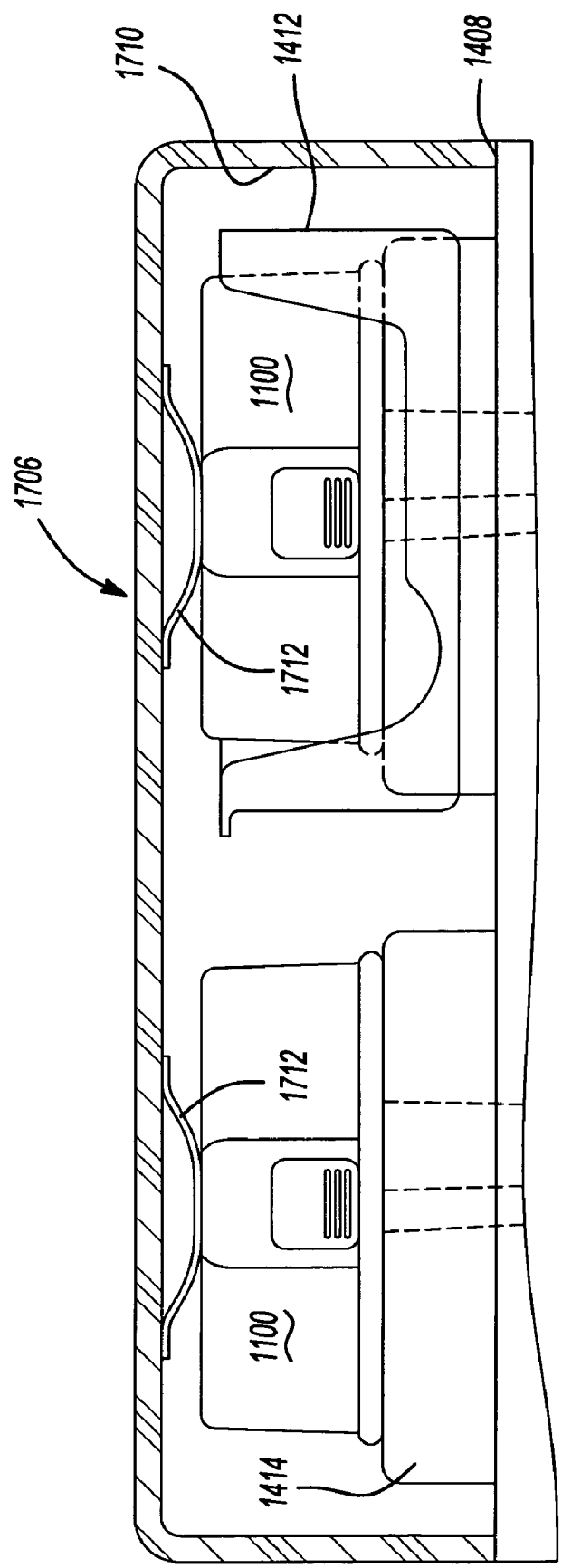
FIG. 20 is a sectional view taken along line 20-20 of FIG. 19.

With reference now to FIGS. 19 and 20, a portable generator 1700 having an enclosure 1706 is shown. The portable generator 1700 may include the frame 1402 that supports the IC engine 1404. The frame 1402 may illustratively support wheels 1401 (FIG. 8), and include handles 1403 for facilitating moving the generator 1700.

An electric generator device (hidden from view in FIG. 14) may be coupled to an output shaft of internal combustion engine 1404. The electric generator device generates AC power, such as has been described above. The AC power may illustratively be 120 VAC (or 110 or 115 VAC) and may also illustratively be 240 VAC (or 220 or 230 VAC). It may be 60 Hz, or may be 50 Hz. Generator 1700 may also include a control panel including AC outlets (not shown in FIG. 14).

Generator 1700 further includes enclosure 1706 mounted to frame 1402. The enclosure 1706, which may illustratively be a water resistant enclosure, includes a rectangular tub shaped base portion 1408 and hinged lid 1710 including biasing members 1712. As will be described, the biasing member 1712 urge the batteries 1100 into the respective battery receptacle 1412 and charger 1414 when the hinged lid 1710 is in a closed position. The biasing member 1712 may comprise any biasing structure such as a leaf spring for example. A pair of latches 1720 may be provided on the hinged lid 1710 for securably coupling to a pair of hooks 1722 provided on the base portion 1408 when hinged lid 1710 is in the closed position.

The base portion 1408 of enclosure 1406 includes battery receptacle 1412, charger 1414 and AC outlet 1416. Battery receptacle 1412 is configured to receive a battery pack from a cordless power tool, such as battery pack 1100. In this regard, battery receptacle 1412 may be configured to receive a tower type of battery pack, such as battery pack 1100, as is charger 1414. As such, battery receptacle 1412 may illustratively have a configuration similar to battery receptacle 912 described above. Battery receptacle 1412 may alternatively be configured to receive a rail type of battery pack, such as battery pack 16 shown in U.S. Pat. No. 6,653,815, the disclosure of which is incorporated herein in its entirety by reference. As such, battery receptacle 1412 has a configuration similar to that on the foot of tool 10 of U.S. Pat. No. 6,653,815. That is, battery receptacle 1412 includes a pair of grooves that receives guide rails of the rail type battery pack. It also includes a connector configured to mate with the terminal block of the rail type battery pack.

With specific reference now to FIG. 20, the hinged lid 1710 is shown in the closed position. As illustrated, the biasing members 1712 engage an upper surface of the battery packs 1100 and urge them downward into the receptacles 1412 and charger 1414. As a result, electrical connection of battery packs 1100 in receptacle 1412 and charger 1414 may be maintained during movement of the generator system 1700 such as by physical movement of the generator system 1700 as a whole or by vibratory movement communicated by the IC engine 14 during use. It is appreciated that the biasing members 1712 may additionally be provided on the housing 1616 disclosed for use with the permanent battery pack 1612 (FIG. 17).

Figure 21:
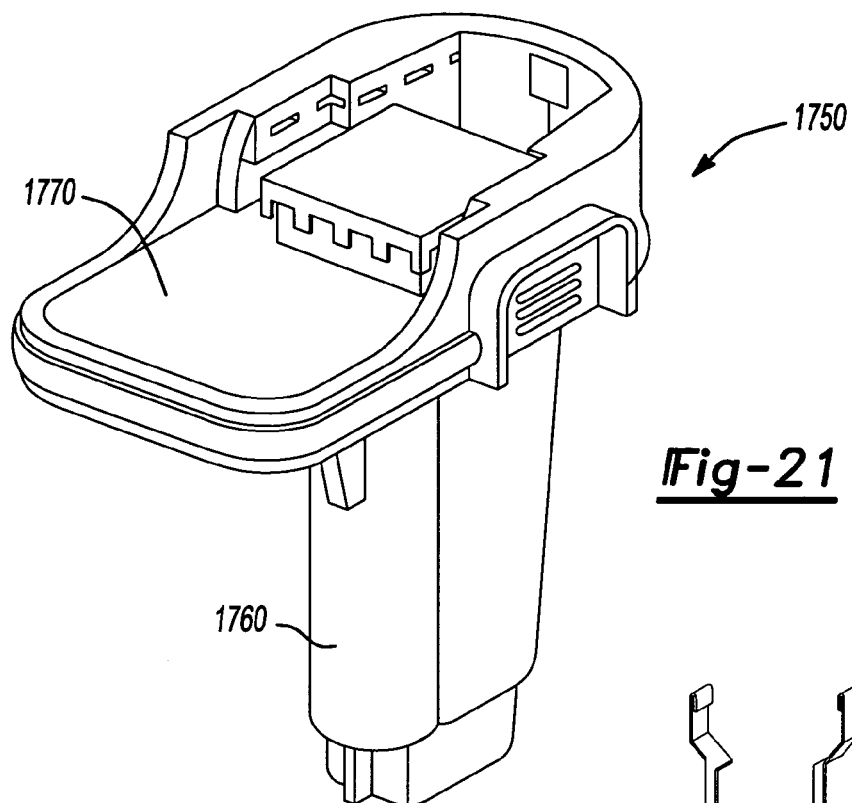
FIGS. 21 and 22 are side perspective views of adapters for accepting battery packs having various geometries.
Figure 22:
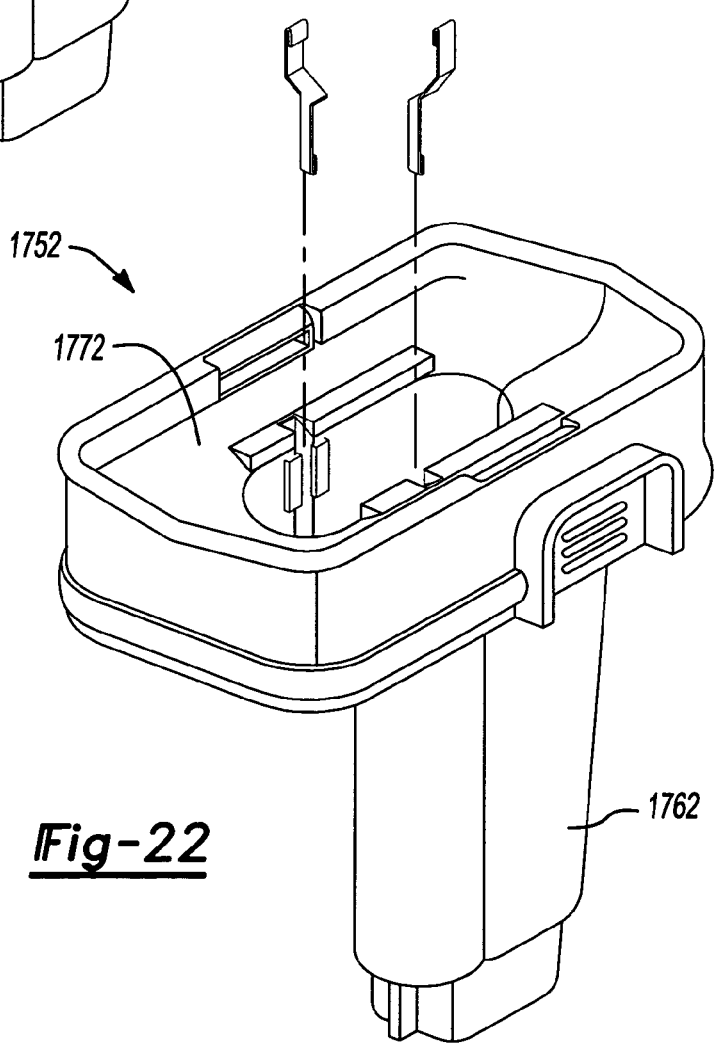

Turning now to FIGS. 21 and 22, a pair of adapters 1750 and 1752 according to additional features of the present teachings are illustrated. The adapters 1750 and 1752 each have insertion portions 1760 and 1762, respectively for receipt into battery receptacles 912 (FIGS. 8-10) and/or 1412 (FIGS. 14,19 and 20). The adapter 1750 has a battery receptacle portion 1770 while the adapter 1752 has a battery receptacle portion 1772. Terminals 1776 may be located in the battery receptacle portion 1772 for electrical communication with a battery pack (not shown) received into the adapter 1752 in the battery receptacle portion 1772. As will be described, the adapters may be selectively inserted into any of the battery receptacles 912, and/or 1412 enabling battery receptacles 912 and or 1412 to accept battery packs having different footprints. In one aspect, these battery packs may be battery packs for use with power tools such as for different brands of power tools. Footprint as used with respect to a battery back relates to a battery receptacle portion 1772 of adapter 1752 means that part of the battery pack that is received in the battery receptacle portion 1772.

As can be appreciated, the respective battery receptacle portions 1770 and 1772 may define complementary geometry to accept battery packs having a footprint distinct from the tower 1104 of the DEWALT battery pack 1100 described in the examples above (FIG. 11). During use, a desired adapter 1750 or 1752 may be selectively inserted into battery receptacle 912, and/or 1412. One skilled in the art will appreciate that the insertion portions 1760 and 1762 mate with the receptacles 912 and/or 1412 similar to a battery pack 1100. Once the desired adapter has been inserted, a battery pack (not shown) having complementary mating structure with the battery receptacle portions 1770 or 1772 may be selectively inserted into the adapter 1750,1752.

In one example, the additional height realized by using the adapter 1750, 1752 may be accommodated by the biasing member 1712. In another example, other biasing members and/or hinged lids 1710 may be provided to accommodate various geometry battery packs.

Figure 23:
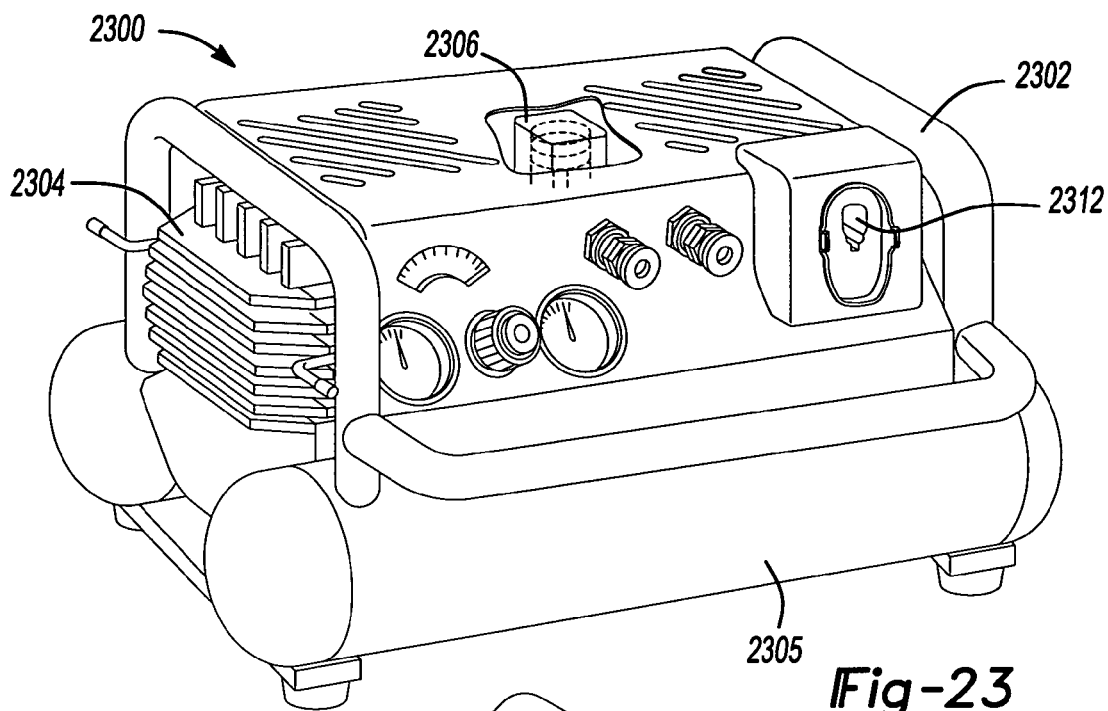
FIG. 23 is a side perspective view of a compressor in accordance with an aspect of the invention.

FIG. 23 shows a compressor 2300 in accordance with an aspect of the invention. The compressor 2300 may incorporate any of the features discussed herein with respect to the portable generators 800 and/or 1400. The compressor 2300 includes a frame 2302 that supports an internal combustion engine 2304, an output device such as air compressor 2306 driven by the internal combustion engine 2304, and an air tank 2305 coupled to an output of the air compressor 2306. A battery receptacle 2312 may be electrically coupled to an electrically powered starting device for starting the internal combustion engine 2304 and/or charging the battery, such as the starting devices and charging circuits described above. In this way, the power generating device 16 may be replaced with an output device such as the compressor 2306, or other associated output of the compressor 2300.

Figure 24:
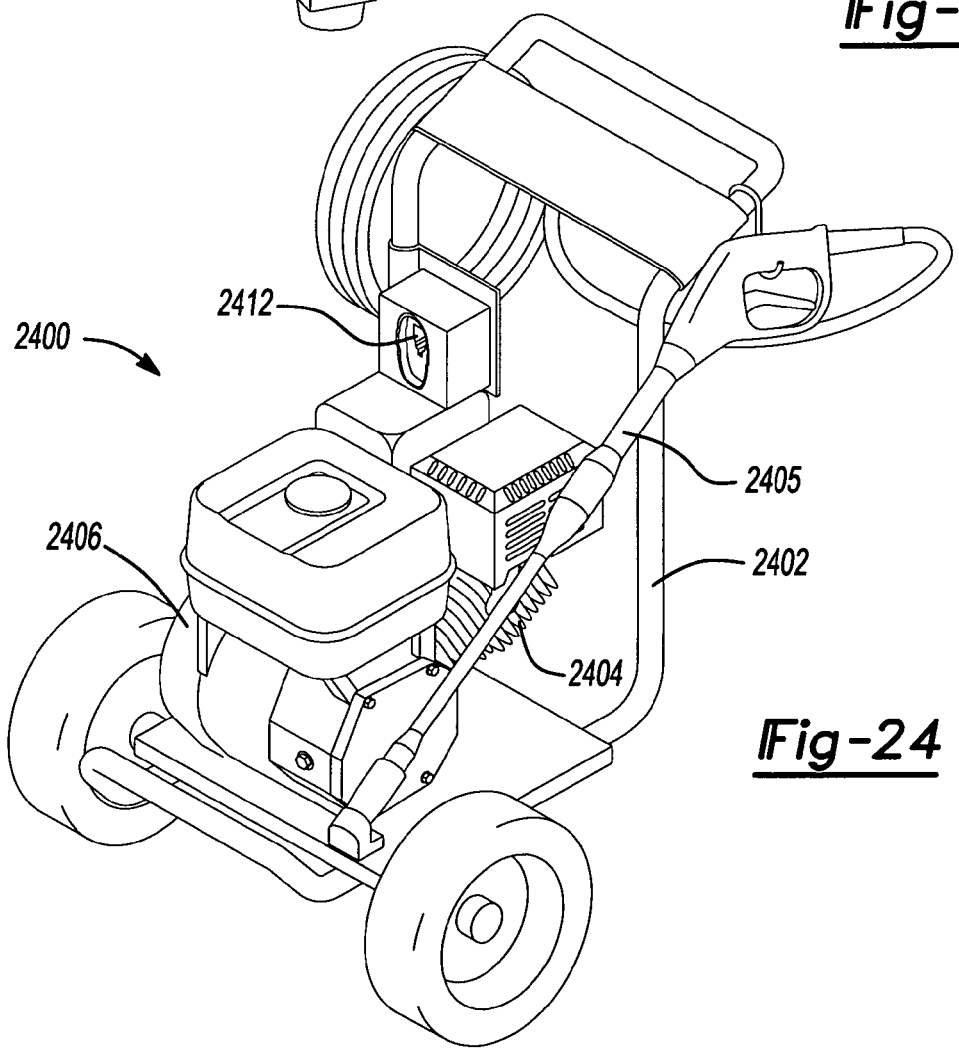
FIG. 24 is a side perspective view of a power washer in accordance with an aspect of the invention.

FIG. 24 shows a power washer 2400 in accordance with an aspect of the invention. The power washer 2400 may incorporate any of the features discussed herein with respect to the portable generator 800 and/or 1400. The power washer 2400 includes a frame 2402 that supports an internal combustion engine 2404 and an output device such as a pump 2406 driven by the internal combustion engine 2404. An output of pump 2406 is coupled to a movable spray wand 2405. A battery receptacle 2412 may be electrically coupled to an electrically powered starting device for starting the internal combustion engine 2404 and/or charging the battery, such as the starting devices and charging circuits described above. In this way, the power generating device 16 may be replaced with an output device such as a pressure regulating device, spray wand 2405, or other associated output of the power washer 2400.

It is appreciated that other power driven apparatus may be adapted for use with the means for starting the internal combustion engine as disclosed herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A portable electrical generator system, comprising:
a manually movable frame supporting an internal combustion engine that drives a generator device supported on the frame that generates AC power, the internal combustion engine coupled to the generator device;
a starting device coupled to the internal combustion engine;
a control panel coupled to the frame having at least one AC outlet coupled to the generator device;
an enclosure supported by the frame having a battery receptacle therein electrically coupled to the starting device, the battery receptacle configured to receive a cordless power tool battery pack, the battery pack received in the battery receptacle and providing electrical power to the starting device; and
a charging circuit electrically coupled between the battery pack received in the receptacle and the generator device when the internal combustion engine is running to charge the battery pack and electrically decoupled from the battery pack when the internal combustion is being started.

2. The system of claim 1, further including a switch moveable from a first position electrically coupling the battery pack to the charging circuit and a second position electrically decoupling the battery pack from the charging circuit.

3. The system of claim 2 wherein the switch, when in its first position, electrically decouples the battery pack from the starting device and when in its second position, electrically couples the battery pack to the starting device.

4. The system of claim 1 wherein the enclosure includes a hinged lid and a base portion, the base portion having the battery receptacle.

5. The system of claim 4 wherein the base portion further includes a charger configured to receive the battery pack from the cordless power tool.

6. The system of claim 5 wherein the base portion includes an AC outlet electrically coupled to the generator device, the charger a stand alone charger that is mounted in the base portion of the enclosure and plugged into the AC outlet of the base portion.

7. The system of claim 1 wherein the battery receptacle is configured to receive a tower type battery pack.

8. The system of claim 1 wherein the battery receptacle is configured to receive a rail type battery pack.

9. The system of claim 1 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

10. The system of claim 1 wherein the enclosure includes a hinged lid moveable between an open position and a closed position, the lid having at least one biasing member that, when the lid is in the closed position, contacts the battery pack to urge the battery pack into the battery receptacle.

11. A portable electrical generator system, comprising:
a manually movable frame supporting an internal combustion engine that drives a generator device supported on the frame that generates AC power, the internal combustion engine coupled to the generator device;
a starting device coupled to the internal combustion engine;
a control panel coupled to the frame having at least one AC outlet coupled to the generator device; and
a cordless power tool battery pack secured to the generator system by at least one fastening device, the battery pack providing electrical power to the starting device.

12. The system of claim 11 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

13. A portable electrical generator system, comprising:
a manually movable frame supporting an internal combustion engine that drives a generator device supported on the frame that generates AC power, the internal combustion engine coupled to the generator device;
a starting device coupled to the internal combustion engine;
a control panel coupled to the frame having at least one AC outlet coupled to the generator device; and
an enclosure supported by the frame having a battery receptacle therein electrically coupled to the starting device, the battery receptacle configured to receive a cordless power tool battery pack, the battery pack providing electrical power to the starting device when the battery pack is received in the battery receptacle, the enclosure including a hinged lid moveable between an open position and a closed position, the lid having at least one biasing member that, when the lid is in the closed position, contacts the battery pack to urge the battery pack into the battery receptacle.

14. The system of claim 13 wherein the at least one biasing member includes a leaf spring.

15. The system of claim 13 wherein the at least one biasing member includes a plurality of leaf springs.

16. The system of claim 13 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

17. A portable electrical generator system, comprising:
a manually movable frame supporting an internal combustion engine that drives a generator device supported on the frame that generates AC power, the internal combustion engine coupled to the generator device;
a starting device coupled to the internal combustion engine;
a control panel coupled to the frame having at least one AC outlet coupled to the generator device; and
an enclosure supported by the frame having a battery receptacle therein electrically coupled to the starting device, the battery receptacle configured to receive a first cordless power tool battery pack having an insertion portion having a footprint or an adapter having an insertion portion having a footprint that is the same as the footprint of the first cordless tool battery pack, the adapter having a battery receptacle portion configured to receive a second cordless power tool battery pack having a different footprint than the first cordless power tool battery pack.

18. The system of claim 17, further comprising a plurality of adapters, the adapters having insertion portions having footprints that are the same as the footprint of the first cordless tool battery pack and battery receptacle portions configured to receive respective cordless power tool battery packs having footprints that are different and that are different from the footprint of the first cordless power tool battery pack.

19. The system of claim 18 wherein a battery pack that is received in the battery receptacle or the adapter received in the battery receptacle is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack.

20. A portable power driven system, comprising:
a manually movable frame supporting an internal combustion engine that drives an output device supported on the frame, the internal combustion engine coupled to the output device;
a starting device coupled to the internal combustion engine; and
a battery receptacle supported by the frame and electrically coupled to the starting device, the battery receptacle configured to receive a battery pack from a cordless power tool, the battery pack received in the battery receptacle and providing electrical power to the starting device.

21. The system of claim 20 including an enclosure with a hinged lid and a base portion, the base portion having the battery receptacle.

22. The system of claim 21 wherein the lid has at least one biasing member that, when the lid is in the closed position, contacts the battery pack to urge the battery pack into the battery receptacle.

23. The system of claim 22 wherein the at least one biasing member includes a leaf spring.

24. The system of claim 23 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

25. The system of claim 20 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device 26. The system of claim 21 wherein the battery receptacle is configured to receive a tower type battery pack.

27. The system of claim 21 wherein the battery receptacle is configured to receive a rail type battery pack.

28. The system of claim 20 wherein the battery pack is secured to the system by at least one fastening device.

29. The system of claim 20 including at least one adapter having an insertion portion having a footprint that is the same as the footprint of the first cordless tool battery pack, the adapter having a battery receptacle portion configured to receive a second cordless power tool battery pack having a different footprint than the first cordless power tool battery pack.

30. The system of claim 29 wherein the battery pack that is received in the battery receptacle or the adapter is one of a plurality of battery packs having different voltages, the system including a voltage regulation circuit coupling the battery receptacle to the starting device, the voltage regulation circuit providing at an output coupled to the starting device a voltage at a desired level for the starting device.

31. The system of claim 20 wherein power driven system is a compressor and the output device includes an air compressor.

32. The system of claim 29 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

33. The system of claim 24 wherein the power driven system is a compressor and the output device includes an air compressor.

34. The system of claim 33 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

35. The system of claim 29 wherein the power driven system is a compressor and the output device includes an air compressor.

36. The system of claim 35 wherein the battery pack that is received in the battery receptacle or the adapter is one of a plurality of battery packs having different voltages, the system including a voltage regulation circuit coupling the battery receptacle to the starting device, the voltage regulation circuit providing at an output coupled to the starting device a voltage at a desired level for the starting device.

37. The system of claim 20 wherein the power driven system is a power washer and output device includes a pump.

38. The system of claim 37 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

39. The system of claim 24 wherein the power driven system is a power washer and output device includes a pump.

40. The system of claim 39 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

41. The system of claim 29 wherein the power driven system is a power washer and output device includes a pump.

42. The system of claim 41 wherein the battery pack that is received in the battery receptacle or the adapter is one of a plurality of battery packs having different voltages, the system including a voltage regulation circuit coupling the battery receptacle to the starting device, the voltage regulation circuit providing at an output coupled to the starting device a voltage at a desired level for the starting device.

43. A portable power driven system, comprising:
a manually movable frame supporting an internal combustion engine that drives an output device supported on the frame, the internal combustion engine coupled to the output device;
an electrically powered starting device coupled to the internal combustion engine;
a control panel coupled to the frame including a battery receptacle electrically coupled to the starting device;
the battery receptacle materially the same as a foot of a cordless power tool that receives a battery pack; and
the battery pack received in the battery receptacle and providing electrical power to the starting device.

44. The system of claim 43 wherein the battery receptacle includes a housing having an outer plate that conforms to an upper plate of the battery pack and a central bore that conforms to a tower of the battery pack.

45. The system of claim 44 wherein the housing of the battery receptacle includes catches at opposed sides of the outer plate that mate with latches of the battery pack.

46. The system of claim 45 wherein the outer plate of the housing of the battery pack includes a keyway projecting from the bore in the housing of the battery pack that receives a key at a base of the tower of the battery pack.

47. The system of claim 46 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

48. The system of claim 43 wherein the housing of the battery receptacle includes catches at opposed sides that mate with latches of the battery pack.

49. The system of claim 43 including a collar surrounding the housing of the battery receptacle and secured to the control panel to secure the battery receptacle to the control panel.

50. The system of claim 49 wherein the housing of the battery receptacle includes flanges that project from opposed sides of the outer plate that define slots therebetween that mate with inwardly extending projections of the collar.

51. The system of claim 50 wherein the battery receptacle includes a housing having an outer plate that conforms to an upper plate of the battery pack and a bore that conforms to a tower of the battery pack.

52. The system of claim 51 wherein the housing of the battery receptacle includes catches at opposed sides of the outer plate that mate with latches of the battery pack.

53. The system of claim 51 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

54. The system of claim 43 wherein the portable power driven system is a compressor and the output device includes an air compressor.

55. The system of claim 54 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

56. The system of claim 43 wherein the portable power driven system is a power washer and the output device includes a pump.

57. The system of claim 56 wherein the battery receptacle receives a battery pack that is one of a plurality of battery packs having different voltages, the system including a voltage regulation circuit coupling the battery receptacle to the starting device, the voltage regulation circuit providing at an output coupled to the starting device a voltage at a desired level for the starting device regardless of the voltage of the battery pack received in the battery receptacle.

* * * * *